US008122367B2

(12) United States Patent
Krieger et al.

(10) Patent No.: US 8,122,367 B2
(45) Date of Patent: Feb. 21, 2012

(54) AUTOMATED PUBLISHING SYSTEM THAT FACILITATES COLLABORATIVE EDITING AND ACCOUNTABILITY THROUGH VIRTUAL DOCUMENT ARCHITECTURE

(75) Inventors: Michael Alex Krieger, Riegelsville, PA (US); Becky Cartine, Teaneck, NJ (US); Loren E. Davie, Montclair, NJ (US); David T. Napolitan, Brooklyn, NY (US); Amy Smith, Yarmouth, ME (US); Kathie Brown, Upper Black Eddy, PA (US); Scott C. Kelly, New York, NY (US)

(73) Assignee: US Lynx LLC, Riegelsville, PA (US)

( * ) Notice: Subject to any disclaimer, the term of this patent is extended or adjusted under 35 U.S.C. 154(b) by 669 days.

(21) Appl. No.: 10/559,313

(22) PCT Filed: Jul. 8, 2004

(86) PCT No.: PCT/US2004/022200
§ 371 (c)(1),
(2), (4) Date: Mar. 19, 2007

(87) PCT Pub. No.: WO2005/008415
PCT Pub. Date: Jan. 27, 2005

(65) Prior Publication Data
US 2008/0028300 A1    Jan. 31, 2008

(51) Int. Cl.
*G06F 17/00* (2006.01)
(52) U.S. Cl. ........ 715/764; 715/225; 715/255; 715/769; 715/782
(58) Field of Classification Search ............... 715/764, 715/203–264, 799–837
See application file for complete search history.

(56) References Cited

U.S. PATENT DOCUMENTS

| 5,907,837 A * | 5/1999 | Ferrel et al. ............ 707/3 |
| 5,956,736 A | 9/1999 | Hanson et al. |
| 6,332,150 B1 | 12/2001 | Khan et al. |

(Continued)

FOREIGN PATENT DOCUMENTS

WO    WO 99/66425    12/1999

(Continued)

OTHER PUBLICATIONS

Koch M et al. "Using Component Technology for Group Editors—The Iris Group Editor Environment" ECSCW Workshop on Object oriented Groupware Platforms, Sep. 7, 1997, pp. 44-49.

(Continued)

*Primary Examiner* — Quoc A Tran

(57) ABSTRACT

The present invention automates the publishing of financial, legal, and governmental documents and any other publications that are structured and require compliance with corporate or external standards and may share content elements. It gives users control in an always-on, familiar environment: the Internet. Due to its virtual document architecture and ability to operate over the Internet and intranets, the system facilitates collaborative work and traces accountability. The key concept behind automating publishing is to control scheduling and costs by better content management. The present invention handles document content as small, reusable components, down to the paragraph and table cell level. The interface helps users assemble documents from these version-controlled components with automated support. The system applies context and filtering criteria stored with each component to locate and apply content fragments to a current document. The system of the present invention can apply structural rules and content requirements to ensure compliance with regulatory requirements and company business rules. A working virtual document within the system always incorporates the current version of all constituent elements.

49 Claims, 31 Drawing Sheets

U.S. PATENT DOCUMENTS

| | | | |
|---|---|---|---|
| 6,584,480 B1* | 6/2003 | Ferrel et al. | 715/205 |
| 2004/0015408 A1 | 1/2004 | Rauen, IV et al. | |
| 2004/0205656 A1* | 10/2004 | Reulein et al. | 715/530 |
| 2009/0089657 A1* | 4/2009 | Davis | 715/234 |

FOREIGN PATENT DOCUMENTS

| | | |
|---|---|---|
| WO | WO 01/16778 | 3/2001 |
| WO | WO 02/052454 | 7/2002 |

OTHER PUBLICATIONS

Mariani, John A. et al. "Cooperative Info. Sharing: Dev. a Shared Object Service" The Computer Journal, Oxford Univ Press, Surrey GB. 1996, pp. 455-470, vol. 39, No. 6.

* cited by examiner

Instantiation of Business Objects (Profile Tables)

Environment Management for Active Editions

Edition Auto-population

FIG. 15

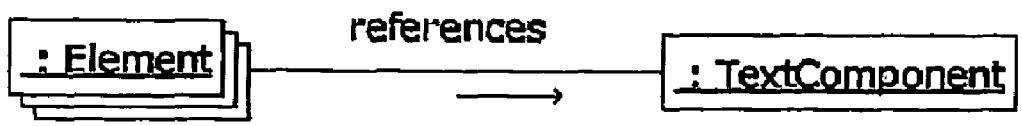

Many elements may have references to the same Component. Changes to Component properties or to its Content will be reflected in all of the Elements that reference that Component.

Element attributes are modified at the element level: they are unique to each individual Element.

Component properties are modified at the component level: they are shared amongst all referencing elements.

AUTOMATED PUBLISHING SYSTEM THAT FACILITATES COLLABORATIVE EDITING AND ACCOUNTABILITY THROUGH VIRTUAL DOCUMENT ARCHITECTURE

FIELD OF THE INVENTION

The present invention relates to the collaborative preparation, composition, and publishing of documents that form a set of closely related and similarly structured documents that may share content elements. The document set/sets require structural and content control to conform to business rules and/or regulatory requirements and may require presentation simultaneously in different formats and media. The document publishing effort is time and cost sensitive.

BACKGROUND OF THE INVENTION

The prevalent mode of document preparation to date has been (1) a serial mode of manufacturing and (2) a dependency on data source availability that controls publishing schedules. The process also entails transferring client data from their preparation system, such as Word, to another manufacturing system for typesetting and preparation for print. In this process, the printer can introduce printer's errors (PEs, not billable to client), which must be separated from author's alterations (AAs, billable) during the billing process.

When a set of documents shares text or other elements, any changes to the elements must be rippled through the entire set of documents, which often have different publication dates. The prevalent manual solution is to distribute notes to the editors responsible for individual documents that require changes. This method does not guarantee currency (because of other changes that may occur during the elapsed time between publication dates) and does not enforce the change process itself.

Older electronic methods of approaching this problem, such as the boilerplate library, introduced on early proprietary word-processing systems, often imported the boilerplate element into the document itself. A later, more generalized method involved the use of Standard Generalized Markup Language (SGML), an ISO international standard. SGML sets out a standard, open method for writing a set of rules for marking up a group of documents sharing the same general structure and content types. SGML introduced a method for storing boilerplate or standing text and inserting it by reference; the boilerplate could reside outside the document itself. However, the reference was still embedded in the document stream and the document had to identify the source of the boilerplate reference. There was no efficient way to handle fragment publishing.

A later adaptation of SGML is Extensible Markup Language (XML), also a method of describing the structure and content elements of documents, it has won acceptance on the World Wide Web (WWW). XML, like SGML, effectively separates structure and content from visual formatting. The challenge posed to the inventors was to develop a mechanism that effectively incorporated shared elements without embedding them in a streaming document. The invention's use of XML solved the problem of enforcing structure and describing content, and a further separation—of structure from content—was realized by using XML elements to point to content without containing it. The result is a virtual document.

SUMMARY OF THE INVENTION

The present invention is directed to a system that handles documents as small, reusable shared components, down to a paragraph and table cell level. In the system, a user interface allows a user to generate a publication from these version-controlled components with automated support.

The present invention has many advantages over conventional publishing methods. For instance, the present invention decreases time to publication because the accuracy and consistency it provides leads to fewer errors. It provides accountability by logging and documenting all changes. It allows for direct collaboration over the Internet. It also solves the problem of divided responsibilities for document content, such as between administration's control of numbers and legal department's need to control disclosures In addition, any number of proofing rounds and author's alterations can be produced without time delays. Commenting and proof distributions can be performed electronically. The system also provides full text searching capabilities in a unified scheme that can reference all system objects. It includes tools to prevent changes to components shared with other documents. The system provides for flexible scheduling and also allows a user to work ahead without confusion in versioning. Global changes are made automatically throughout the library. There is greater control over system administration due to the ability of an administrator to set up restricted workgroups.

The above described system may be applicable in a variety of situations. For instance:

- when a group of documents share a significant amount of content—by managing document components at the paragraph level, components can be shared among documents at a granularity that maximizes efficiency and flexibility, in contrast to systems that deal only in large chunks of content.
- When shared components need revision—the change needs to be made only once. Component attributes that capture business and regulatory rules control in which documents they appear,
- When documents must conform to one or more regulatory environments.—the system may store structural outlines and component versions for each environment.
- When document preparation is a collaborative process—in situations involving multiple authors, such as textbook publishing, authors can open the same book or section of a book for collaborative work in real time. Sections of documents may be prepared by different work groups within an enterprise.
- When a company's documents are assembled from data contributed by outside companies—makers of subcontracted parts of larger systems may provide and own portions of the documentation and each contributor can work on the document simultaneously (rather than assembling the full document from fragments).
- When documents must appear in many languages without delays—the system has a robust translation management system that ensures revisions are translated by electronic notifications to translators when changes occur and each paragraph is bound to its other language and localization versions.
- When the review process involves a number of external contributors—comments from reviewers can be submitted electronically and entered into a tracking system that gives editors formal notification of comments down to component level and reviewers may have access to fully typeset proofs on the web.
- When content requires protection from unauthorized revisions—the system may establish ownership of content down to the paragraph level.

When a company has an inventory of models that need documentation—service and user manuals have both similarities and differences across models.

When companies wish to publish customized documents and not break their budgets—the system may easily integrate links to external databases to drive customization and it can produce high-quality on-demand print masters quickly and automatically.

When documents have tight deadlines and must publish simultaneously in several formats—the system may deliver new, fully typeset proofs on demand, in minutes. The system simultaneously delivers proofs/masters in the formats demanded by the user's business needs.

Some industries that find themselves facing these situations include financial and insurance services, major manufacturing businesses, textbook and journal publishing, governance, national and transnational, legal publishing, airplane manufacturing, defense industries, regulated producers such as energy, drug, and food providers, and software companies.

As embodied in the invention, a publication is a document that (1) the client identifies as different from other publishable documents because of its subject matter, audience, purpose, etc.; that (2) must conform to the corporate identity and business rules of an enterprise; that (3) may be published in a conventionally distributed form such as print or Internet files; and that (4) may recur periodically in newly published form. By definition, a publication has a language property and one only (a multi-lingual publication has a unique set of languages). Any publication must conform to its publication type, a formal definition of the generalized rules for a publication's contents, their order, and parent/child relationships. A group of related publications that share some amount of content and are governed by a discrete set of publication types is termed a publication set. For instance, in the financial services industry a prospectus may have a publication type, a shareholder's report may have its own distinct publication type, but they may be part of the same publication set of shareholder communications, since they may share financial tables, disclosures, portfolio managers' biographies, etc. Since the invention creates virtual documents by using pointers to structural elements that in turn point to content, documents of different structural types may share the same content.

Because the invention revolves around the atomization of a publication, work groups responsible for different parts of the document can work on a virtual document simultaneously as shown in FIG. 14. Document content can be created before an edition of the document itself. In the serial model of manufacturing, there are frequent points in the schedule where collaborators must meet for approvals and work group handovers. In an embodiment of the invention, collaborators can approve the components of documents for which they are responsible as their components are finalized and notify other team members by email. For instance, most financial services companies assign tabular data to a product administration group, checking for required language and disclosures to a legal group, and descriptions of investment policy and goals to marketing and/or portfolio managers. These different types of content can be created at any time and, using the various filtering capabilities of the system, pre-assigned to one or more documents. The system thus enables diffused or collaborative responsibility for a document's contents, all without physical or electronic hand-offs from one group to another.

FIGS. 26a, 26b, and 26c depict a comparison between a prior art method and one embodiment of the method in accordance with the invention. As is evidenced by the complexity of document preparation shown in the prior art method, the applicants have recognized that a more simplified document preparation such as that shown in FIG. 26c would be beneficial. In addressing one client's needs, the applicants also recognized that: (a) documents of its financial services and other clients were made up of components used globally across a document set, by a specific sub-set, or by only one document; (b) making updates to shared components was a time-consuming, often inaccurate process; (c) the clients' documents were bound to conform to legal, regulatory, and company marketing requirements; (d) there were severe penalties upon the clients for not publishing on time and even more severe penalties for not including required material and legal disclosures; (e) schedules were impeded by data source availability timelines and external sourcing of fund accounting, legal services, or other third-party editorial contributions; (f) company personnel were already preparing documents in a desktop environment for internal reviews before being sent to the composition services provider; (g) important material was being keyboarded redundantly by the service provider, introducing errors on a regular basis, although the client's documents had been submitted for composition lacking those errors; (h) the print service provider required an exchange of material before composition or changes to pages could begin and a turnaround lag was required, from 48 to 8 hours; and (i) the serial nature of the ordinary process for producing proofs and then publishing introduced time lags that affected scheduling for the worse. The latter factor is especially significant as the deadline for printing comes nearer.

In addition, financial services clients are required to submit their documents electronically to government regulators in a particular format, and this submission must be made simultaneously with print preparation; this fact was another source of scheduling problems, since there was always a time lag between approval to print and the service provider's delivery of the regulatory file format, known as EDGAR II. The process for generating the EDGAR II files did not always derive from the same data source as the print generation.

The present invention addresses those issues by completely changing the work flow and process of document preparation, review, editing, tracking changes, gathering comments, generating proofs and blacklined proofs, billing, and creating the print and ancillary file formats (such as EDGAR II) of the document.

In an embodiment of the invention, the system enables important functions through its encoding in XML. Using this open markup standard enables automated, simultaneous transformations into different data/file formats from a single data source, also known as view transformations. For instance, financial services clients can receive composed proof pages in PDF format, EDGAR II, and HTML whenever a proof is requested. XML also functions as filtering criteria in evaluating candidate components for inclusion in a publication.

In an embodiment of the invention, the system introduces a new method of editing structured documents that preserves structural information but still allows normal point-and-click editing. The structure bar concept is fully described in the Detailed Description and shown in FIGS. 20 to 25.

In an embodiment of the invention, the system is client-activated and client-directed. The real-time operation by the users means that material is never passed in physical or faxed form to a printing company, and there are no "turnaround" gaps while the client waits for the printer to deliver a proof. The client can generate a proof of the document's current state at any time for no added cost and with minimal delay. The client users are in full control of their work and the process. No third-party service provider ever touches the component or document data; only the client does. There is no concept of PEs (printer's errors), because the data is never exchanged between manufacturing systems.

The client, using the permissions system built into the Client Interface (Command Layer) (FIG. 1), controls access to the system by setting up a detailed permissions list of users. Permissions control many aspects of the user interface including the system options presented to the viewer. Component and document data cannot be read or otherwise accessed by unauthorized users on either client or service provider sides. Security of the client's work is protected from interception, as might happen in the conventional model of handoffs between manufacturing systems. The system is both the source of content and the producer of all output formats, including composed pages; it is a seamless manufacturing system for publications.

In an embodiment of the invention, the system operates in the World Wide Web environment on the Internet or using the same protocols on a dedicated Intranet. The cost advantage to the client is that there is no equipment or software to purchase and most clients have "always on" Internet access. The clients interact with the invention and its server over the Web in real time. Users can access the system from anywhere at any time of day, night, or time zone, given a device with a standard browser and a connection to the Internet. In effect, the system never closes. The system does not have to rely on LAN connections and thus is independent of site or equipment.

In an embodiment of the invention, the system stores profile tables of all the client's documents and their publishing schedules. These tables also store other aspects of the subject matter of a client's documents, such as which products, services, and/or topics are covered in a document (multi-level). For instance, many financial services companies combine mutual finds into a prospectus that covers some fund type (equity, bond, balanced, money market, etc.) or product line. They may also print different prospectuses for different share classes of their funds—retail, institutional, private management, etc. Such profile tables, discussed later as business object definitions and illustrated in FIGS. 6 and 7, are part of the filtering system for applying specified components to certain documents. The profile tables are reconfigurable to meet a client's needs, and the data is revisable. The "Business Rules" that evaluate components for inclusion in documents are also configurable.

All components, including tables and footnotes, exist independently of particular documents, even those components that are contained in only one document. Components can be applied to any document and, if updated, the updated component will be automatically applied whenever it appears in a document (according to its effective and expiration dates).

The system recognizes the concept of the equivalence of components in terms of differing language properties of the text, matching topics written to conform to different regulatory environments, and product terms and IDs in different market settings. Equivalence is the basis for automating natural language translations and regulatory filings that must fit differing national or state requirements.

Tables and footnotes are handled by a specialized management module. This subsystem allows tables to be created as the data becomes available and, once complete, automatically applied to the appropriate active edition. Tables can also be created in advance of beginning the document to which they will be applied. Footnotes are also created and maintained as independent components; a specialized user interface (UI) allows them to be easily applied to entire tables or to individual table cells and paragraphs.

The revision history for every component is tracked over its life, across all documents. The revision log displays a record for every revision, to which a user can attach explanatory notes; each record lists date of the revision, user who made revision, cover date of document from which user accessed component, proof number in which revision was made, publish date if applicable, and a blacklined display of the component text. Proofs of documents can also be blacklined whenever the user generates a new proof. (Blacklining is a term of art for the marking of a reviewable proof to show where revisions, deletions, and additions have occurred since an earlier state.)

The system allows electronic review and commenting by collaborating experts, inside and outside the client organization. The reviewer comments on a special display version of a generated proof; they can attach comments to any component in the document. These comments will be tracked as issues needing resolution.

Automated view transformations are tied to requests to generate a proof or to publish a document Formats such as EDGAR II are sourced from the same virtual document that generates the typeset proof. Which formats are to be produced and at which points in the process is configurable.

Certain actions trigger automatic notifications to users with permission to receive all such action notifications. Automatic notifications from system to user include: PDF proofs being available, new editions of documents being started, tables having been uploaded, and publishing of documents having been completed. Changes to components are noted in the display of components by a special mark (the revision log will document the changes).

More specifically, the present invention is directed, in an embodiment, to an automated document publishing system comprising a user interface for managing a document, a memory having data stored thereon, said data including at least one of a content library, structural rules, deployment specific data, or deployment specific business processes; a processor for automatically assembling an active edition of the document based on said data stored in said memory; whereby a proof of said document is generated from said active edition; and whereby said document is published when said proof is approved.

BRIEF DESCRIPTION OF THE DRAWINGS

FIG. 15 depicts the relationship between elements and components upon modification of an element in accordance with an embodiment of the invention.

DETAILED DESCRIPTION OF THE INVENTION

Figure 1:
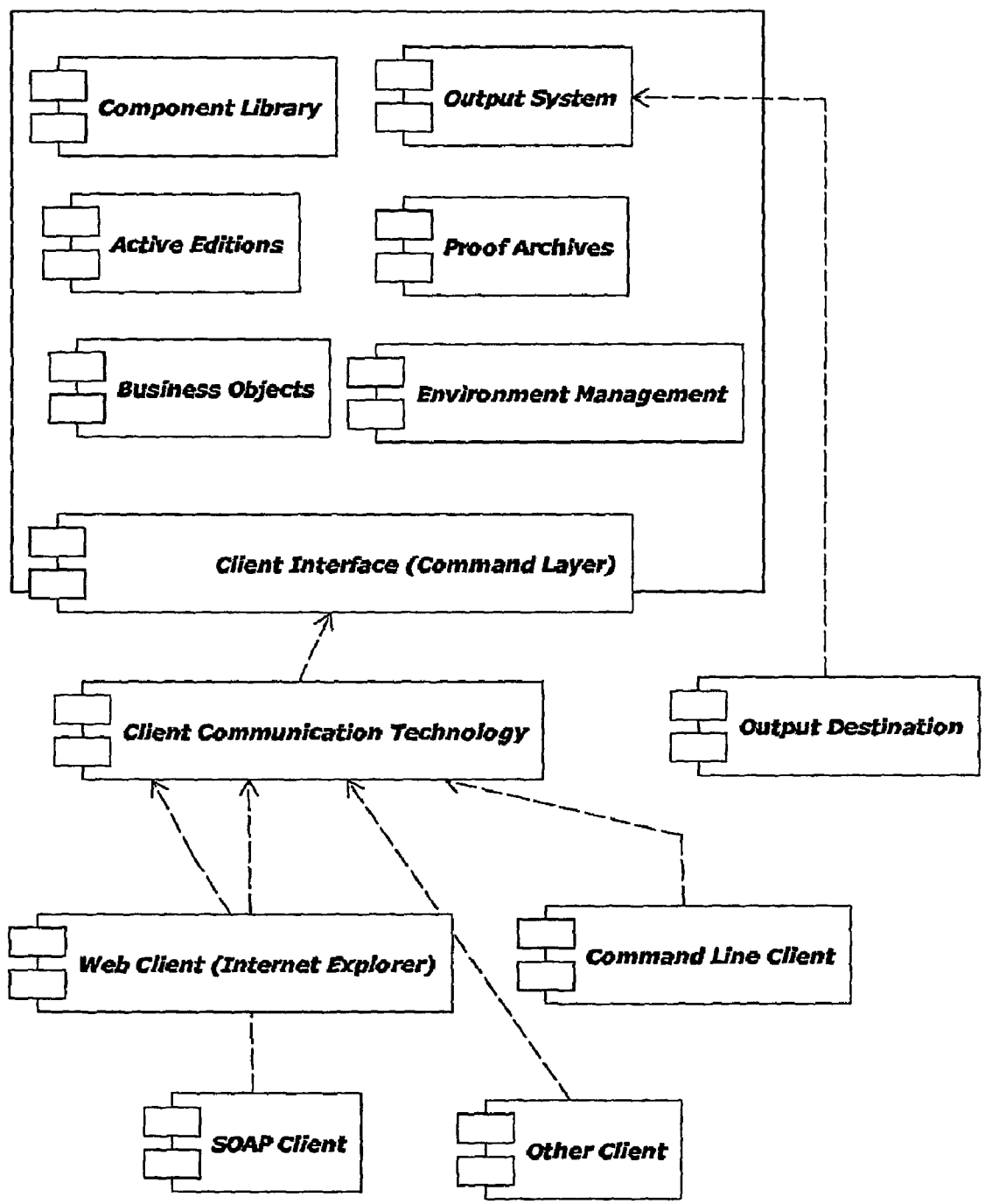
FIG. 1 depicts the gross architecture of the system and its routing through the Client Interface (Command Layer) to user clients in accordance with an embodiment of the invention.
Figure 2:
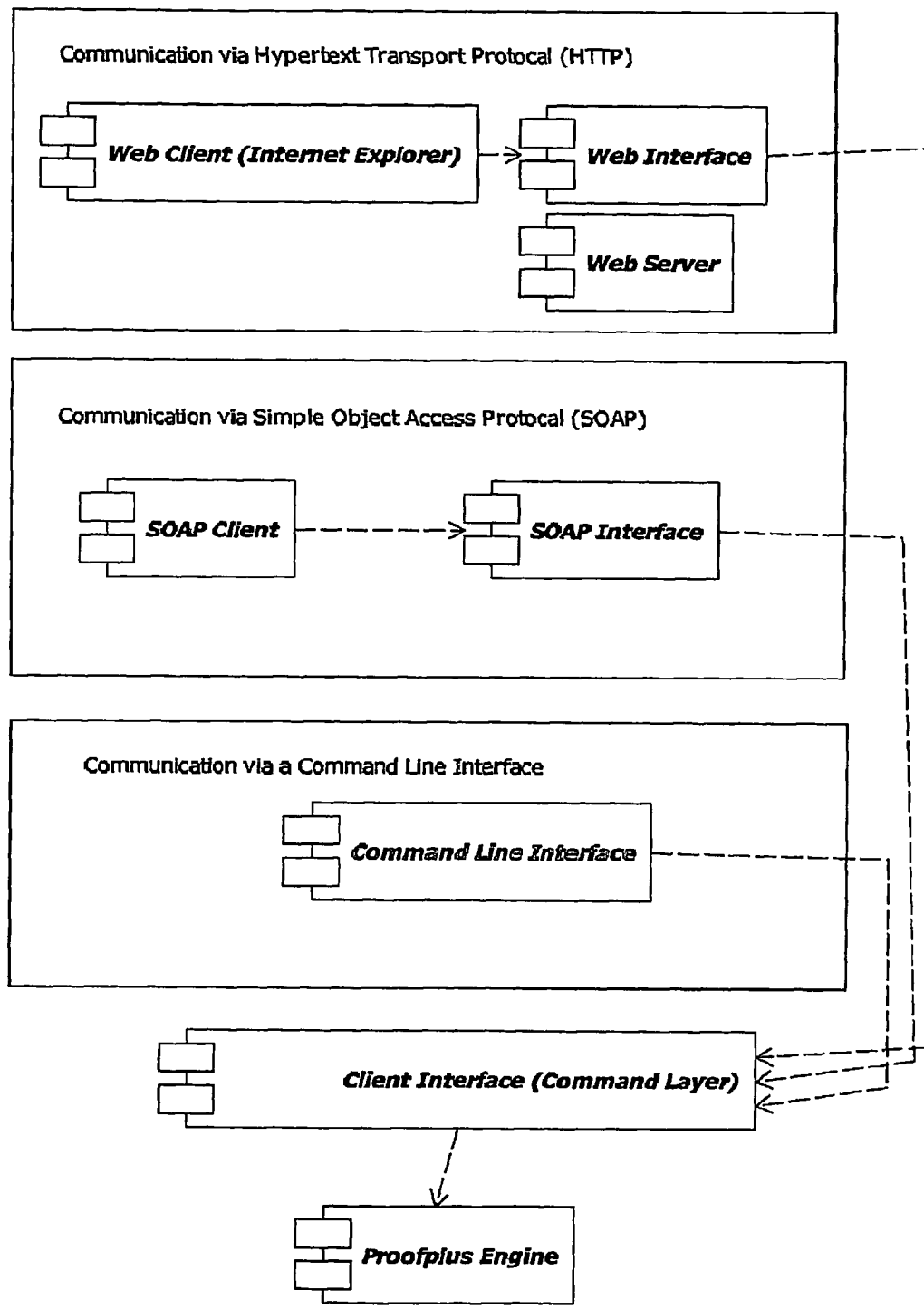
FIG. 2 depicts various client communication protocols, all routing through the Client Interface (Command Layer) in accordance with an embodiment of the invention.
Figure 3:
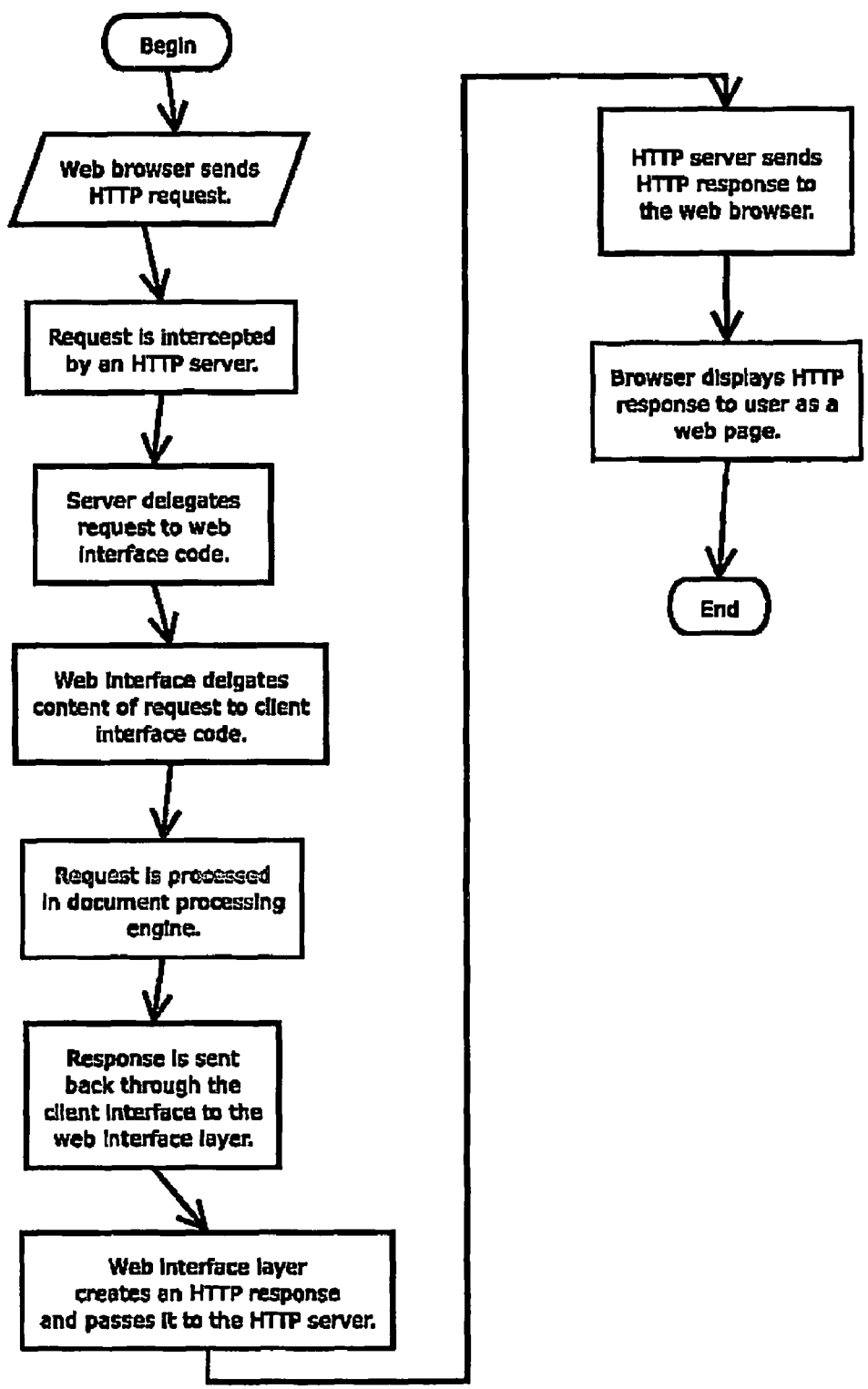
FIG. 3 is a flow diagram of an HTTP communication workflow in accordance with an embodiment of the invention.
Figure 4:
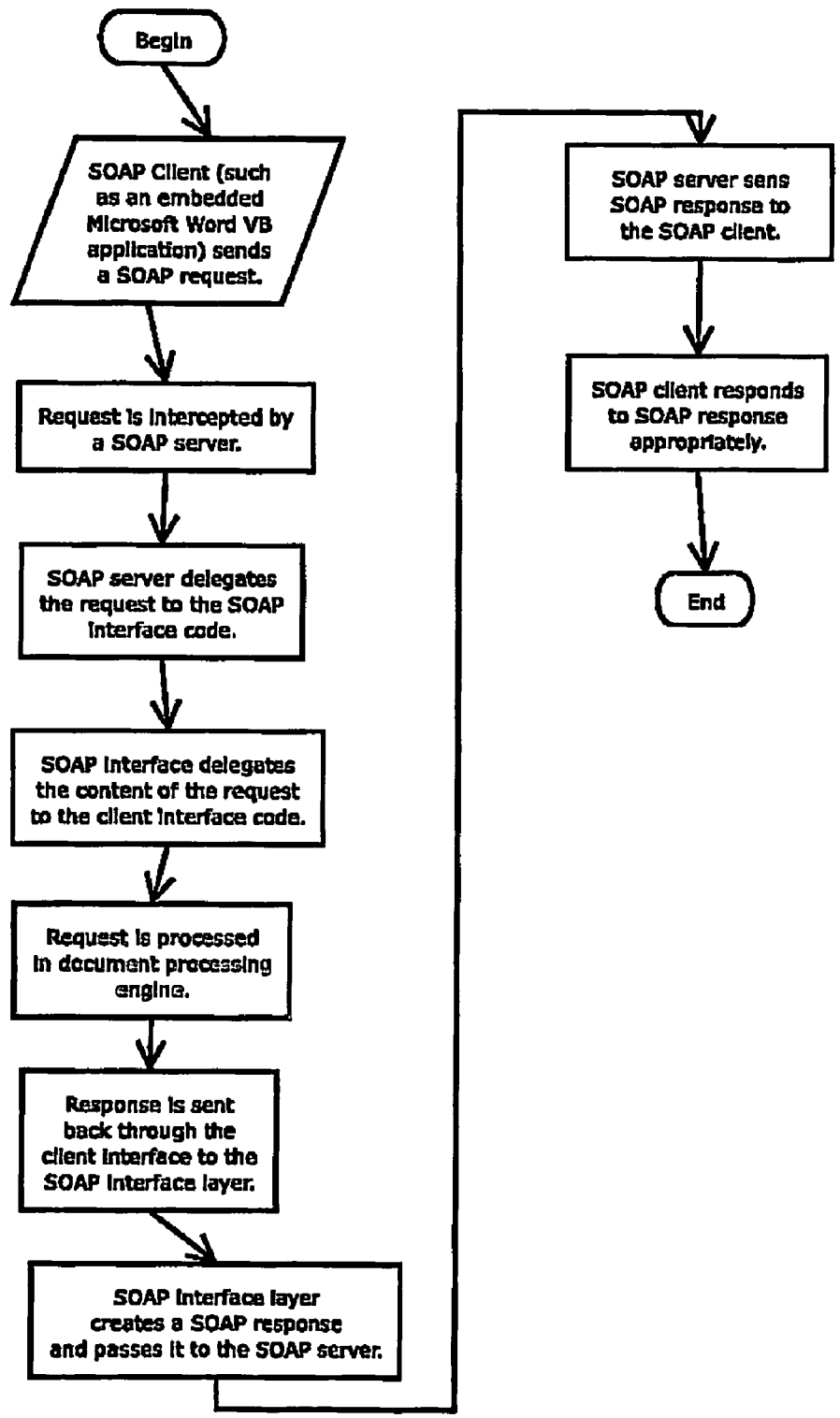
FIG. 4 is a flow diagram of a SOAP (Simple Object Access Protocol) communication workflow in accordance with an embodiment of the invention.

The invention assembles and generates virtual editions of documents rather than a serial document file with embedded content. A document is a bounded collection of content intended to communicate a set of information to a specific set of recipients, whether internal or external to an organization. In this definition, documents are not transitory, day-to-day communications among colleagues, such as letters and memos. Documents in accordance with an embodiment of the invention are presented in some formalized layout or format amenable to wider distribution. Documents can contain, but are not limited to, titling and other identifiers, expository text, graphic illustrations, charts, tables, internal references such as tables of contents and indexes, and other references such as footnotes or URL links.

The system utilizes the concept of a structured document. A structured document can be described in terms of the order of its component parts, hierarchical relationships, and types of elements, apart from its literal content or meaning. There are two characteristics of many business and regulatory documents that can make them good candidates for structured treatment: (1) many documents, such as financial and legal documents, have mandated content, and (2) most business and government documents follow a consistent template or set of templates. Therefore, a set of sequencing rules and named content elements can be developed to enforce compliance with an underlying standard whether that standard is formally expressed or implied by conventional practices. New documents and components can be constructed by following the rules.

In an embodiment of the invention, text and other components of the entire document set are broken into small, discrete constituents of a Publication Set. Basically every head, subhead, paragraph, table cell, footnote, list item, et al., is identified as a content component with its own unique ID and can be referenced by document elements. In XML, an element is a demarcated part of a document's data having a declared name, content type, and location in a document. Elements may have parent elements and may contain other elements (child elements). Elements may also contain text data, entities in other notations (such as illustrations), and a few other data types.

Such low-level elements are the children of higher-level components that provide the text elements with a context within a document. These higher-level components may be identified by descriptive markup, such as "Risk Factors" or "Contingent Liabilities." An element's context is hierarchical, beginning with the document's root element itself. (The root element is the first element in a document, contains only elements, and is the parent of all other elements.) The context of an element is part of its metadata and is integral to many processes, such as document generation and narrowing the field of text searches. (Metadata is the collection of data about an element, document, et al. apart from its content, such as timestamps, author, last update, publication type, context, display name, etc.) Elements have rules, or qualifications for component properties, used to locate specific components in the library, e.g., language must equal "Spanish."

The invention stores the content components as discrete, independent records in document-independent tables. An edition of a publication exists only in a virtual sense as a list of its elements. The elements each point at a component ID, rather than containing the content directly. In this way a piece of text may be shared by different elements located in different publications. The element map may be used to base a new publication on an existing one.

The system manages content by maintaining a version-controlled content library of components. A component is a selection of content having properties, which are key-value pairs and may describe the component in a meaningful fashion. The types of components may include, but are not limited to, text, footnote text, table, pointer to an external data feed, numeric, graphic, document fragment, content groups, etc. Each component is a separate entity in the content library. Components may be shared among multiple publications. New components can be added to the library, and new components can be spawned based on existing components. To keep the amount of data stored to a minimum, the system may check for duplicate components over the entire library. Components can be found using the system's unified search facility that can relate all system objects, operating as a query system with full-text search capabilities. Searches can be performed while editing an active edition and also independently from a publication or edition. Components also carry values for:

when they are effective, i.e., when they can be first used in any active edition; and when and if they expire, i.e., are no longer to be part of any active edition. An audit trail is created for every component showing the creation date, creator, update date, update user, revision rationale, and blacklined changes.

Content groups may be constructed when there are multiple versions of a particular component; versions may represent differences in natural language, country-specific wording, and wording targeted for regulatory or business purposes, such as addressing different market segments or covering different product models. Such multiple versions may be related in some way. For instance, each component may cover the same subject area, but be written in a different language or cover laws in different regions. Like any other component, a content group may have its own properties, but it does not have its own content. Rather, content groups reference several other components. The content group will supply the content of one of its components, based on the system's evaluation of its properties and the environment. Component versions may be strongly or weakly related to one another, expressed as having a strong or weak dependence on the primary member of the content group.

Footnotes and tables make up their own set of libraries. Tabular matter is maintained as a document-independent library and can be proofed and edited separately from an active edition. Tables in the library can be applied to any document, with a single command Table data that must be obtained from third parties is accepted by the system using an agreed-upon protocol that identifies the target table type and target document. The protocol also allows footnotes to be assigned in the data feed. Among other things, the system is operable to maintain a library of disclosures and footnotes. User interfaces allows easy assignment of a footnote to whole tables or to individual table cells. Additional discrete libraries, such as inventory data, can be added to the system to accommodate client needs.

The system is broadly configurable for specific deployments. Deployments are specific configurations of the system supported by object tables, properties, rules, and routines based on a user organization's needs. Certain behaviors of the system may be configured as part of the deployment process.

In broad terms, customer business rules and data may drive the distinctions among publications. Organizations may divide or establish ownership and responsibility for publications along division lines, product lines, target markets, national boundaries, areas of expertise, and similar considerations. This data can automate certain document authoring processes, but to do so it needs to be captured in a structured format. Consulting structured data of this sort can be used for such tasks as: determining the subject matter of publications, generating text and points of insertion for URLs and live links, determining the appropriateness of a candidate component for inclusion in an Edition, and resolving variables. To avoid the need to write custom programs for each client, the system has a generalized methodology for building this structured data set; the data set may be queried and integrated into many base functionalities of the system. The method may be configurable at deployment and has a user interface (UI) for updating the data.

The system may utilize client-specific data that it configures as business objects. Business objects must conform to one of the business object definitions that are built for each deployment following a formal framework. The definition includes a name for the object type and a set of properties that may influence the content of documents or be used for text generation or variable resolution.

In an embodiment of the invention, each publication has an environment, or an association of business objects and publication attributes with the document. The environment can be associated at many levels, from publication set to proof, right down to the component level. This environment is an accumulation of values that are inherited from parent to child object. For instance, if an active edition has no specific environment set at the edition level, it would inherit from its parent, the publication, or from the latter's parent, the publication set.

Document objects are usually associated with usage rules, which evaluate environment variables in order to take actions, such as deciding which version of a component to include in a translated document. Rules are statements that reference business object and attribute values in the local environment. They consist of an antecedent and a consequent side. The antecedent side sets out a condition that must evaluate to "true" or otherwise satisfy a value or comparative statement for the consequent actions to take place. The consequent side describes actions to take for various evaluation results. For instance, in the case of a translated document, the publication would have a value for language, inherited by the active edition, to set the language property value that all components must match.

The system does not store documents as text streams but as pointers to elements in the structured document outline. The elements in turn point to specific components. This organization facilitates non-repetitive storage and, most importantly, can accomplish automatic updating of every publication that points to a revised component through its elements. Both elements and components have attributes and properties (respectively) containing values that may be mapped to specific publication/active edition properties according to a client's specific business rules.

Figure 5:
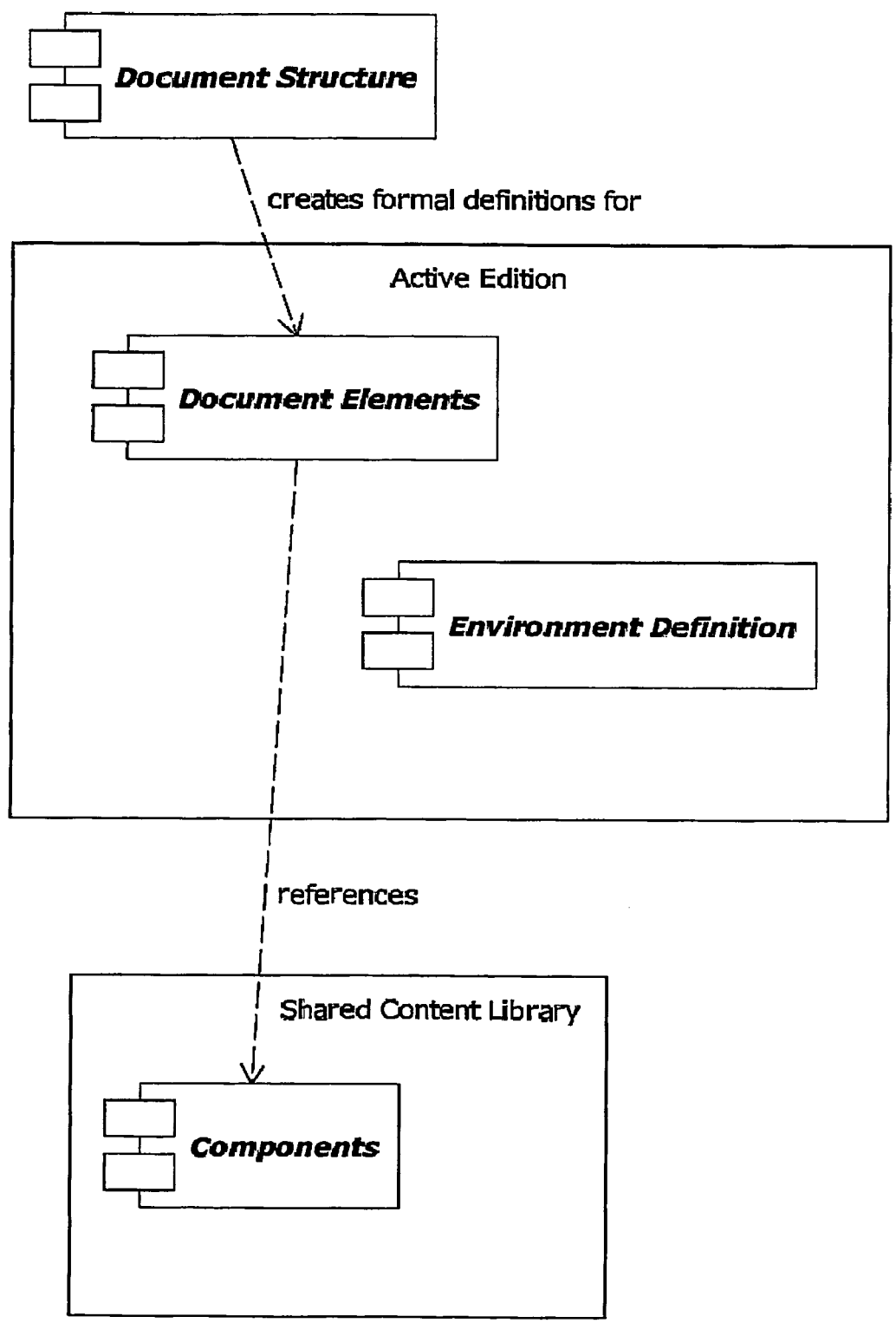
FIG. 5 depicts the architecture underlying Virtual Documents and how they are composed in accordance with an embodiment of the invention.
Figure 6:
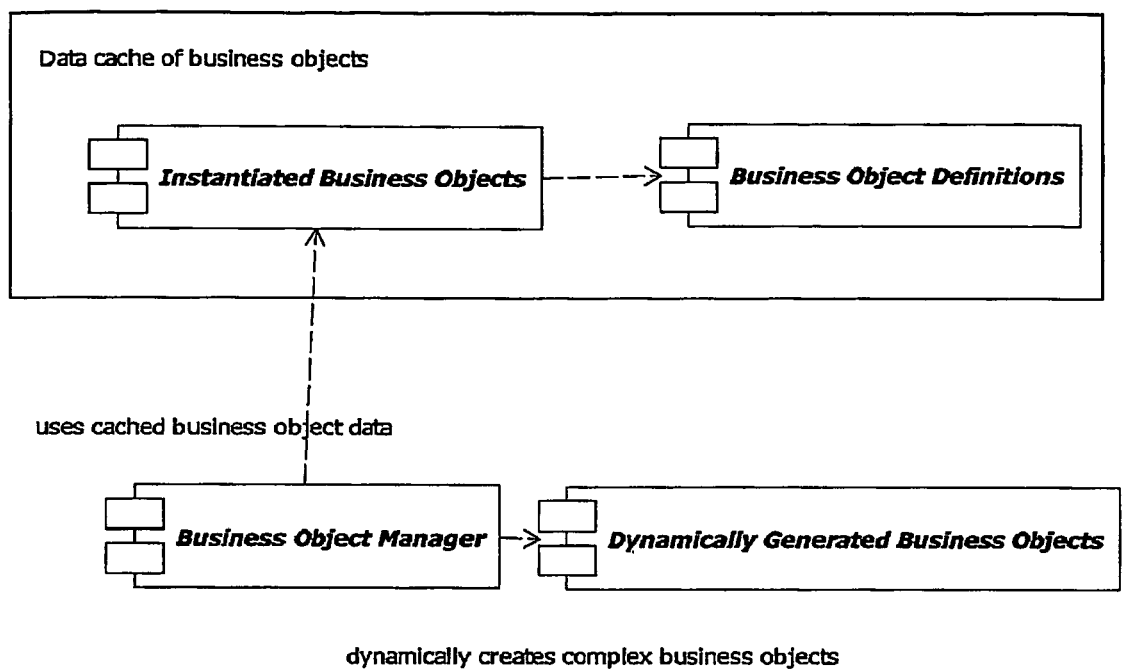
FIG. 6 depicts the architecture of Business Object Management leading to the dynamic creation of complex Business Objects in accordance with an embodiment of the invention.
Figure 7:
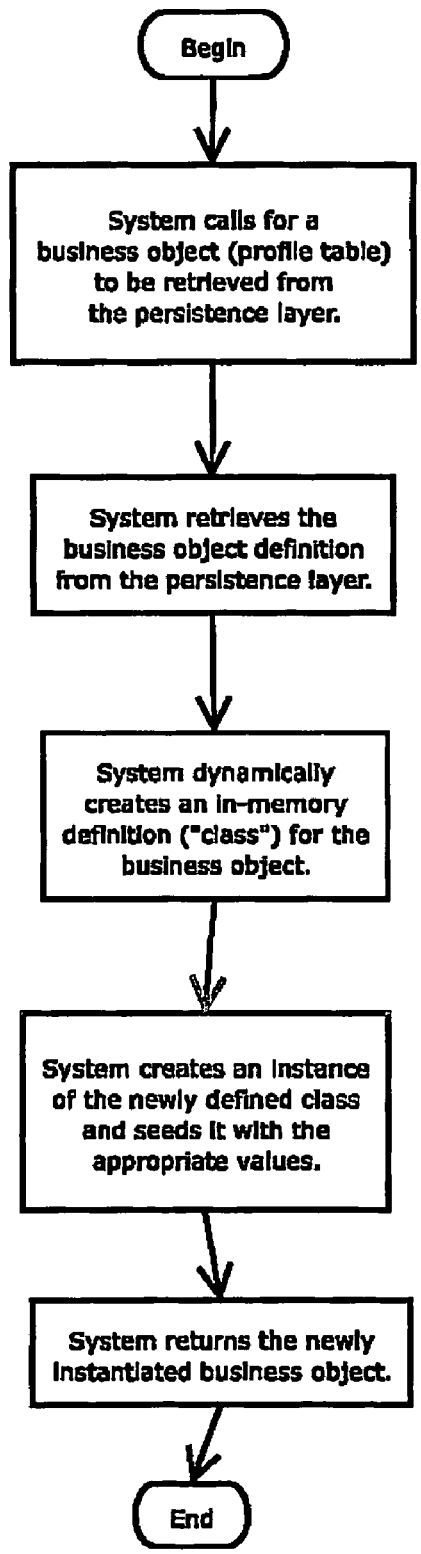
FIG. 7 is a flow diagram showing the instantiation of a Business Object in accordance with an embodiment of the invention.
Figure 8:
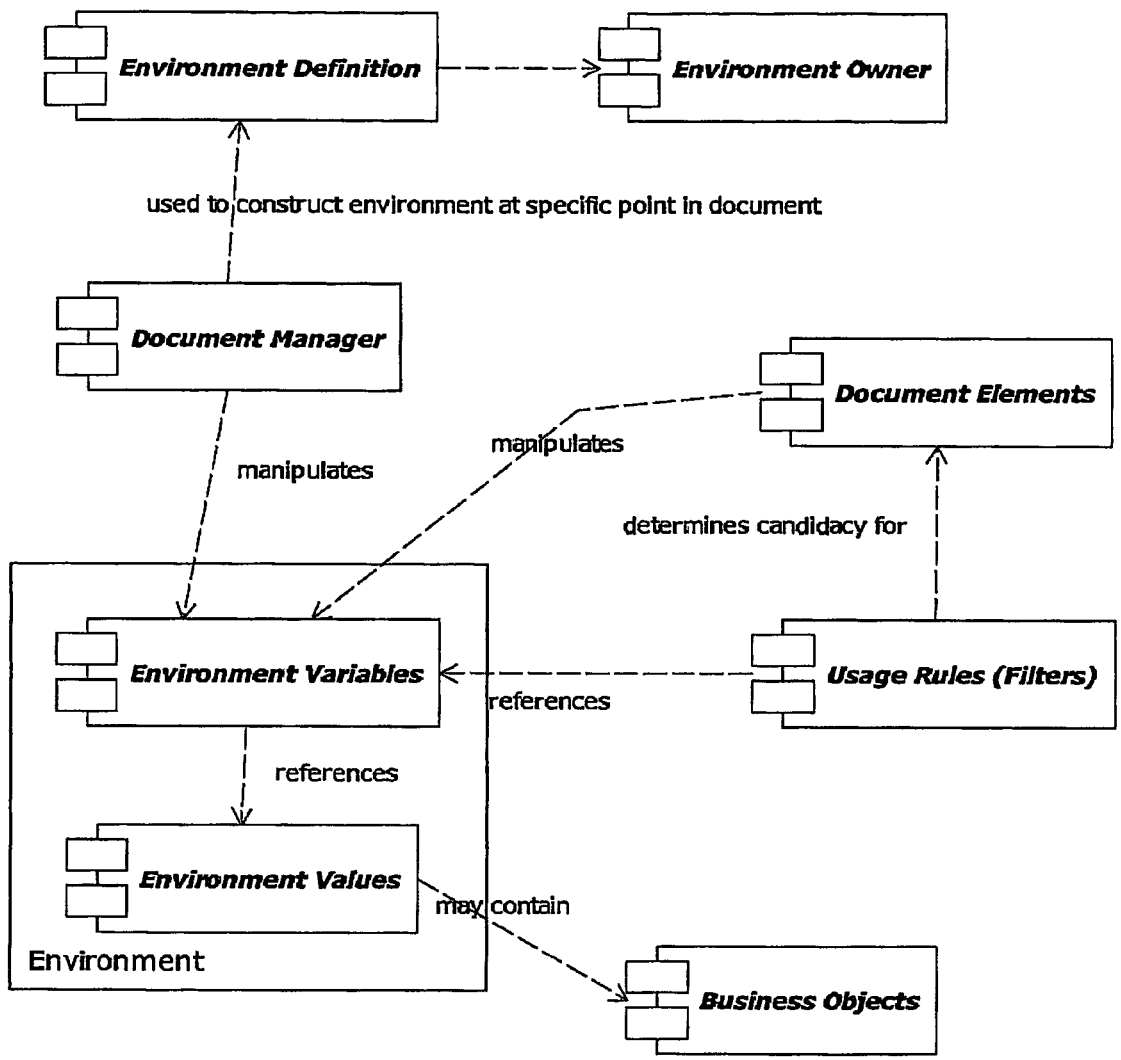
FIG. 8 depicts the architecture of the Environment Management system that constructs the document environment values at any point in the document in accordance with an embodiment of the invention.
Figure 9:
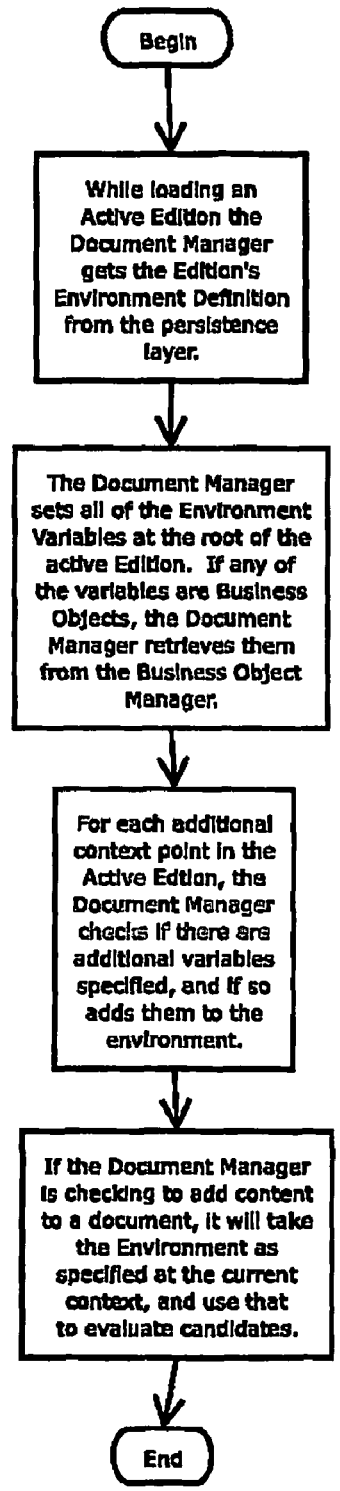
FIG. 9 is a flow diagram showing the construction and updating of the document environment by the Document Manager sub-system in accordance with an embodiment of the invention.
Figure 10:
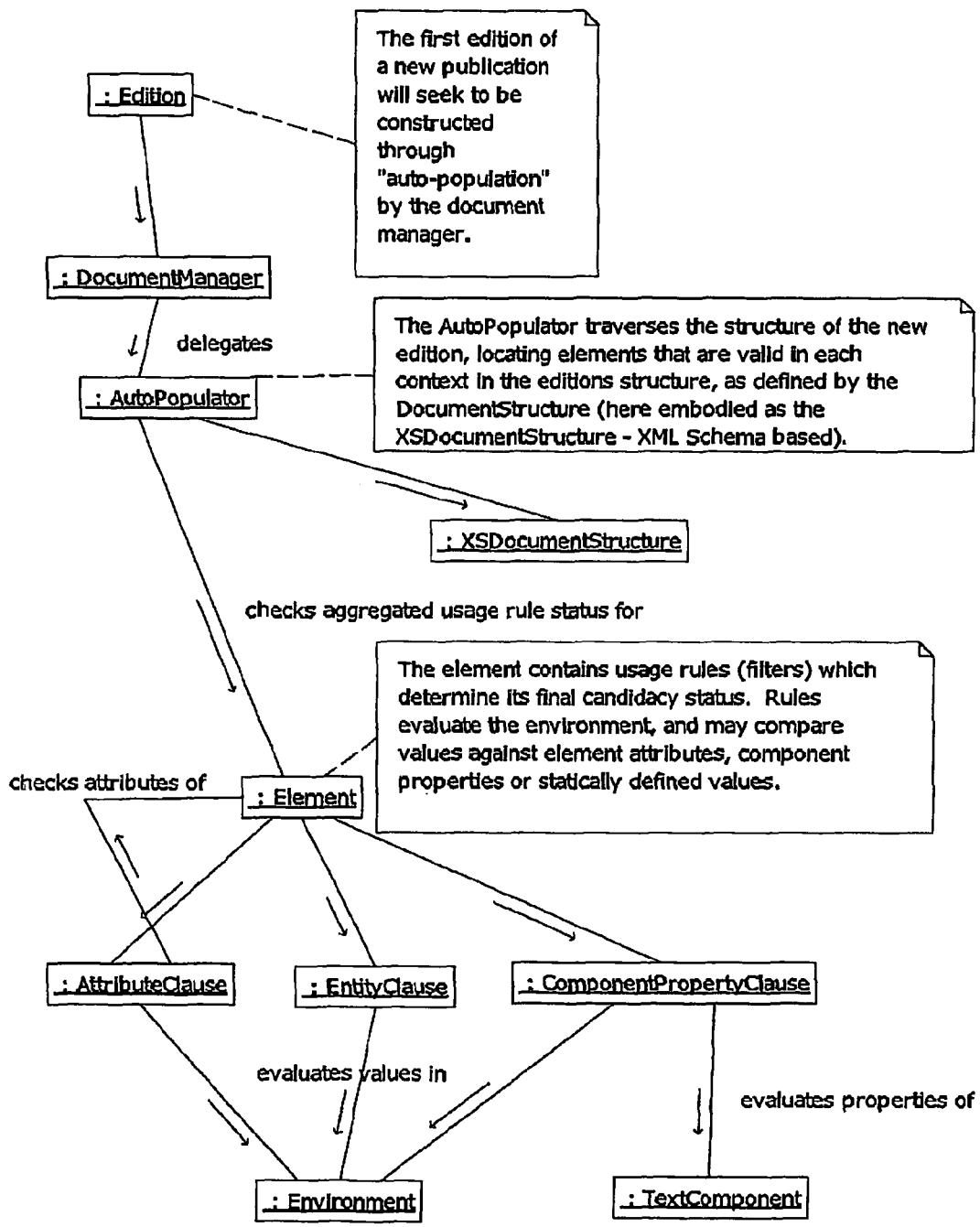
FIG. 10 depicts the architecture and relationships of the Auto Populator as it assembles the first edition of a Publication without reference to another Publication's element map, in accordance with an embodiment of the invention.
Figure 11:
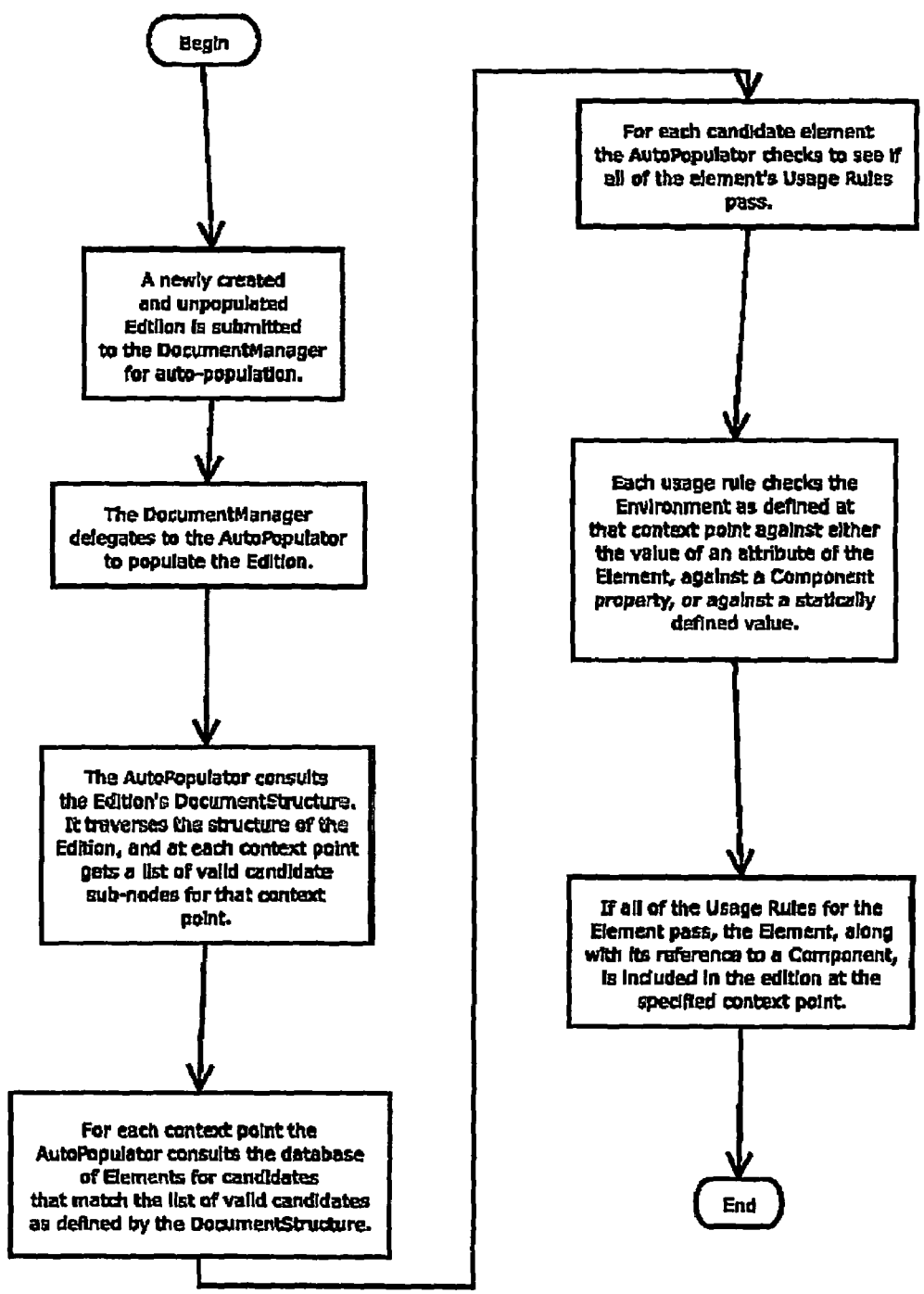
FIG. 11 is a flow diagram of a request to create a document that has no published version in the archive, using DTD and rules only, in accordance with an embodiment of the invention.
Figure 12:
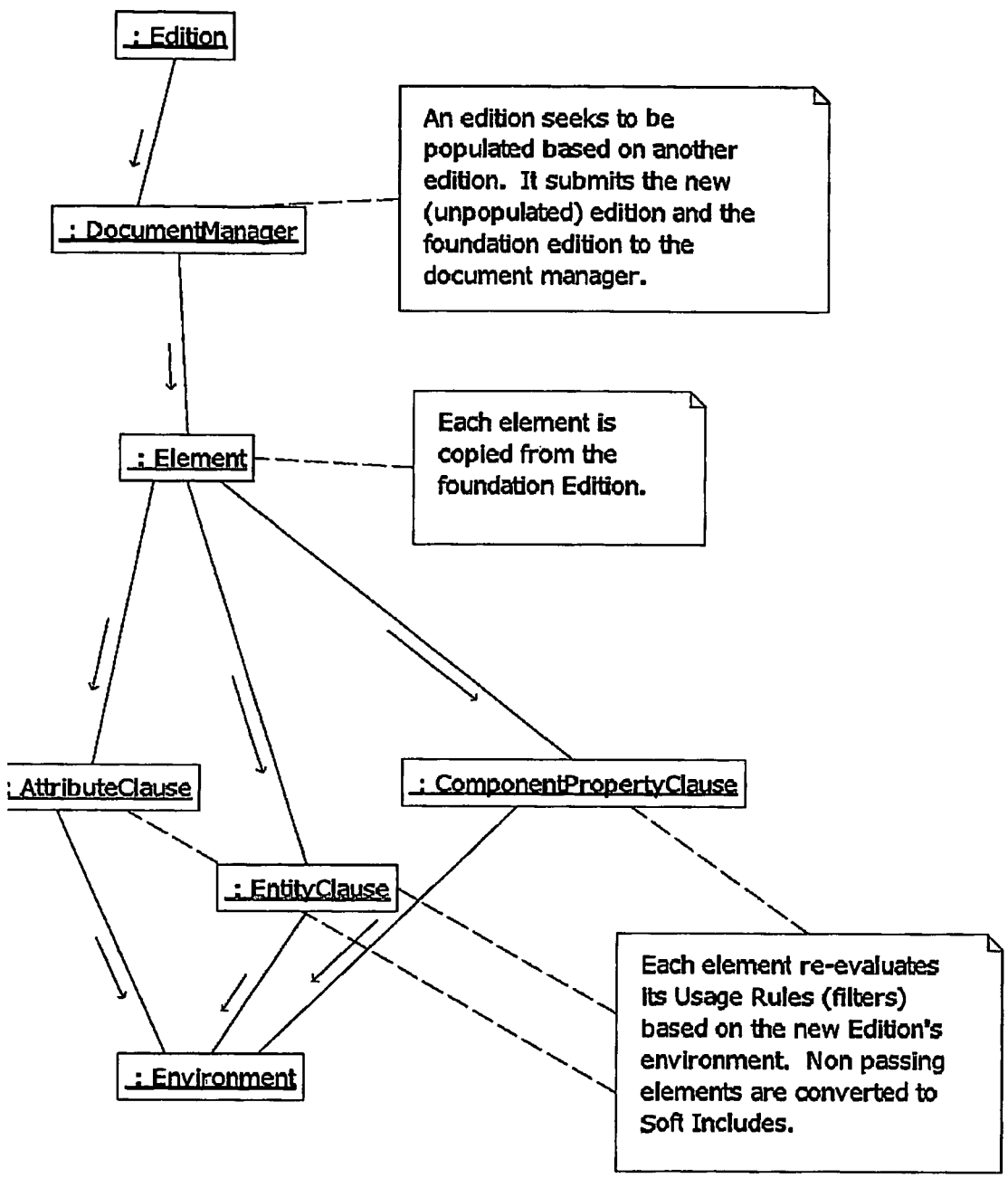
FIG. 12 depicts the architecture and relationships of the Auto Populator as it assembles a new edition based on a Foundation Edition's element map in accordance with an embodiment of the invention.

Publications are the parent of all editions and are governed by structured document definitions, called publication types in an embodiment of the invention. A publication type is instantiated in memory as a document structure (FIG. 5); the document structure guides the AutoPopulator in constructing editions (FIG. 11).

Active editions, which are publications in a revisable state, are assembled from the elements that reference components stored in the libraries. New active editions can be created from existing editions residing in the publication archive.

Every time an active edition is opened by a user, the system gathers the list of elements, and through them, the components in their current state. The edition is assembled on the fly, never stored for editing as a physical stream. The edition exists as a serial entity only when it has been processed for external distribution, e.g., as a proof, EDGAR II file, web posting, archive of published document, etc.

Figure 13:
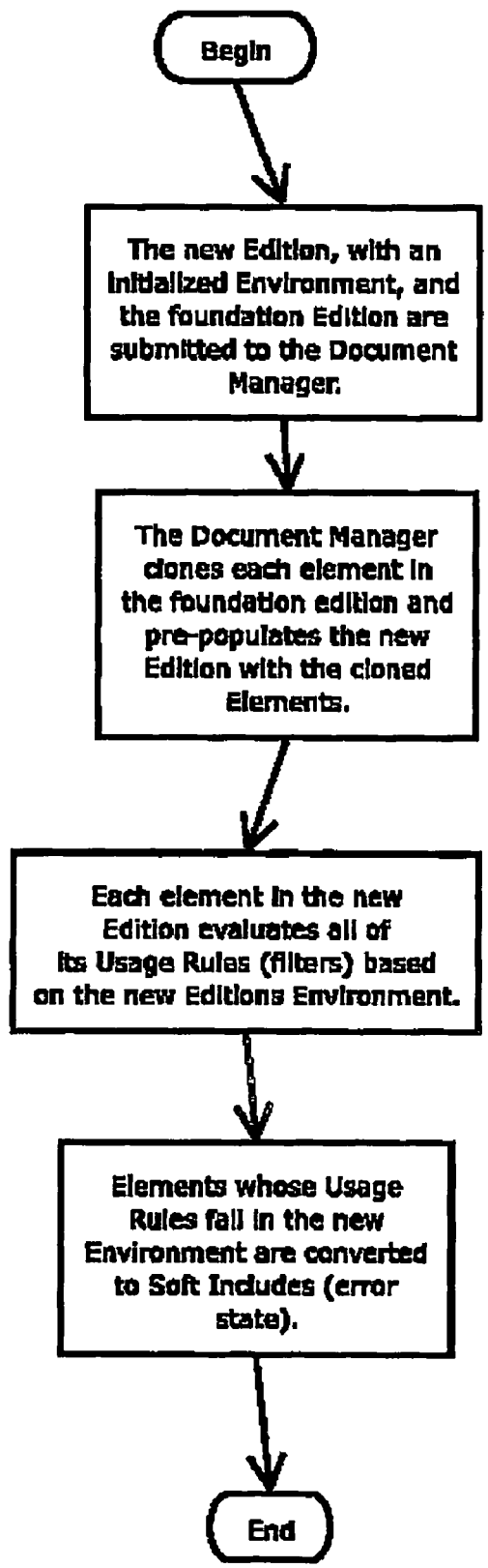
FIG. 13 is a flow diagram of a request to initiate a new edition of a published and archived document, the Foundation Edition, in accordance with an embodiment of the invention.
Figure 14:
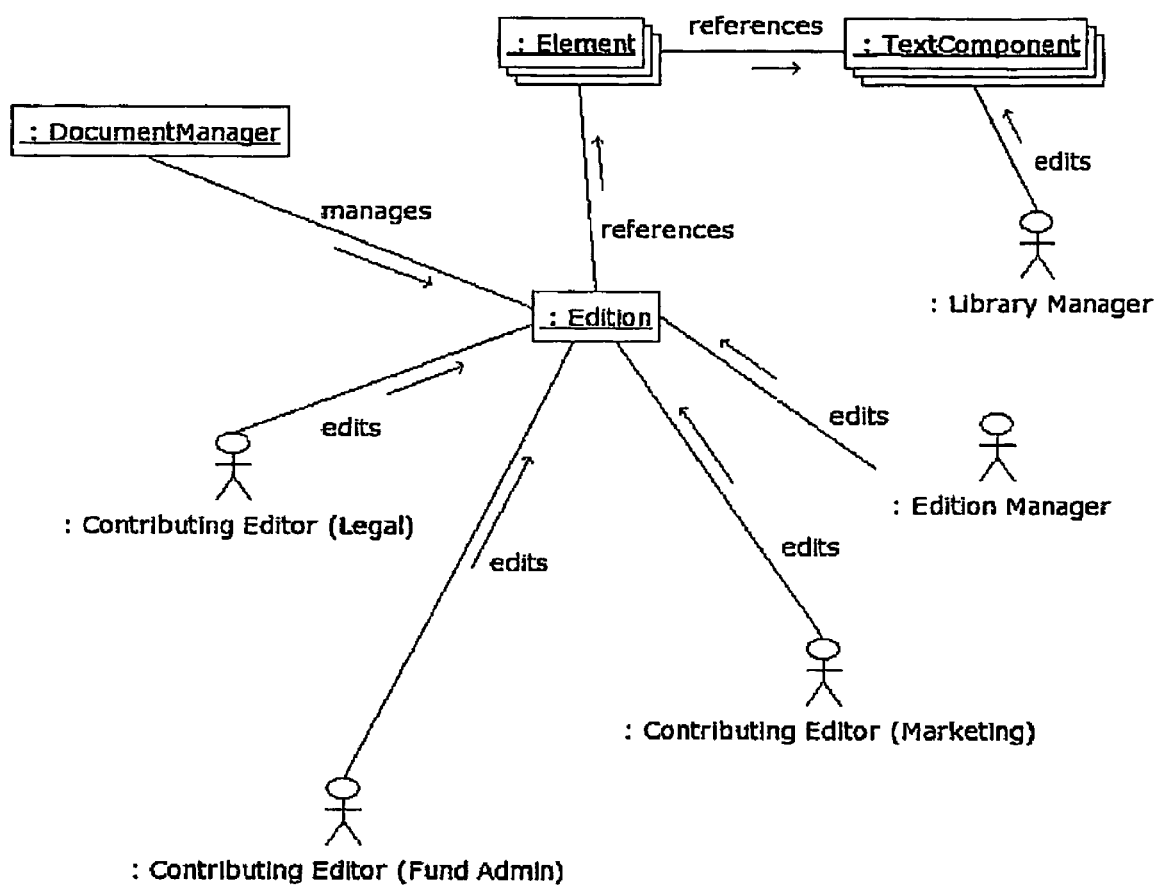
FIG. 14 is a diagram of multiple work groups working on the same document according to their area of responsibility in accordance with an embodiment of the invention.
Figure 16:
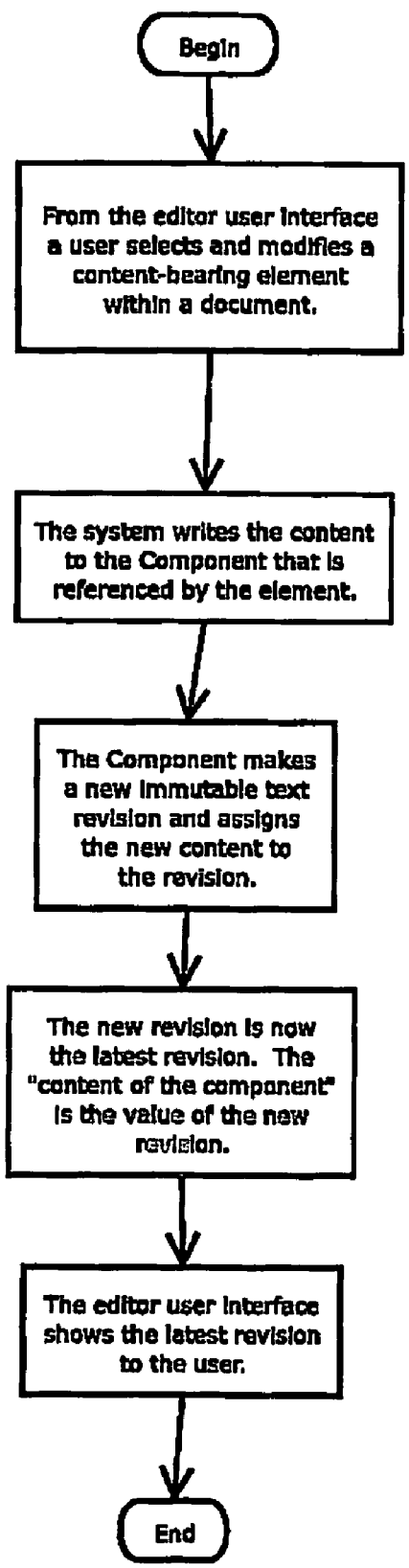
FIG. 16 is a flow diagram showing the process of modifying a component.
Figure 17:
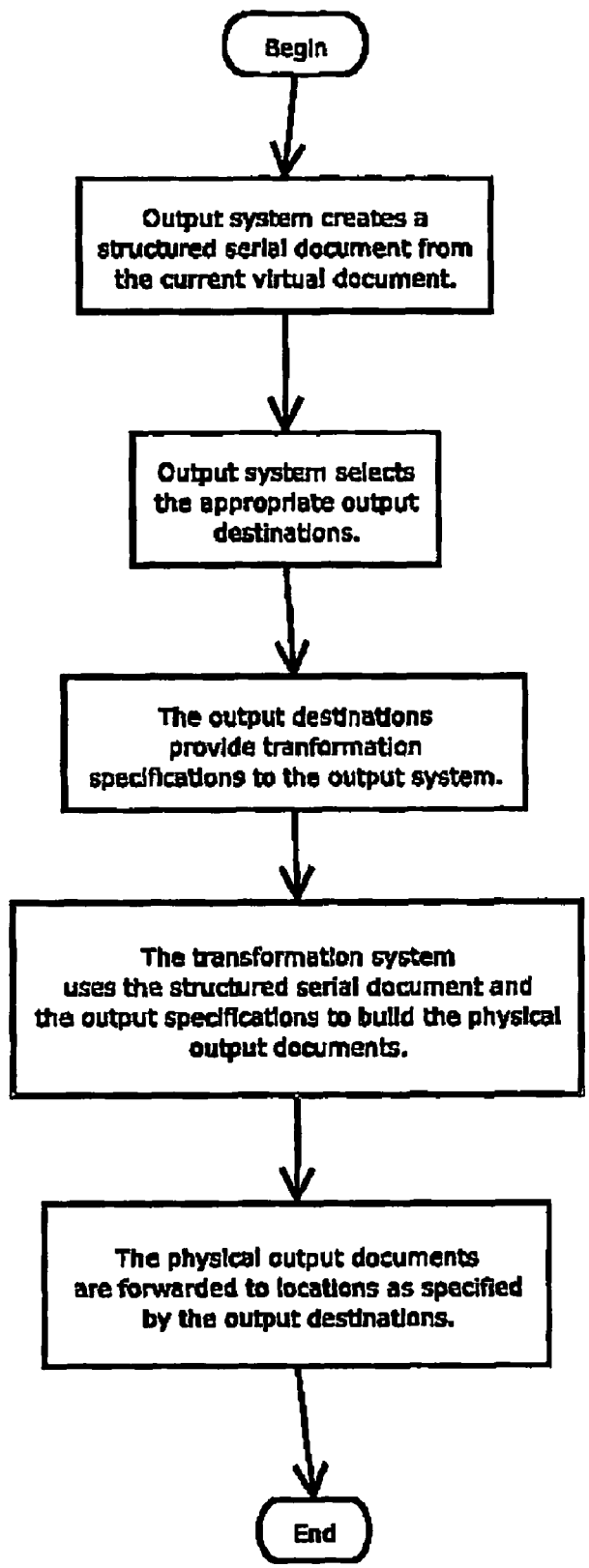
FIG. 17 is a flow diagram of a request to generate a proof and the system's posting of physical output documents to specified locations in accordance with an embodiment of the invention.
Figure 18:
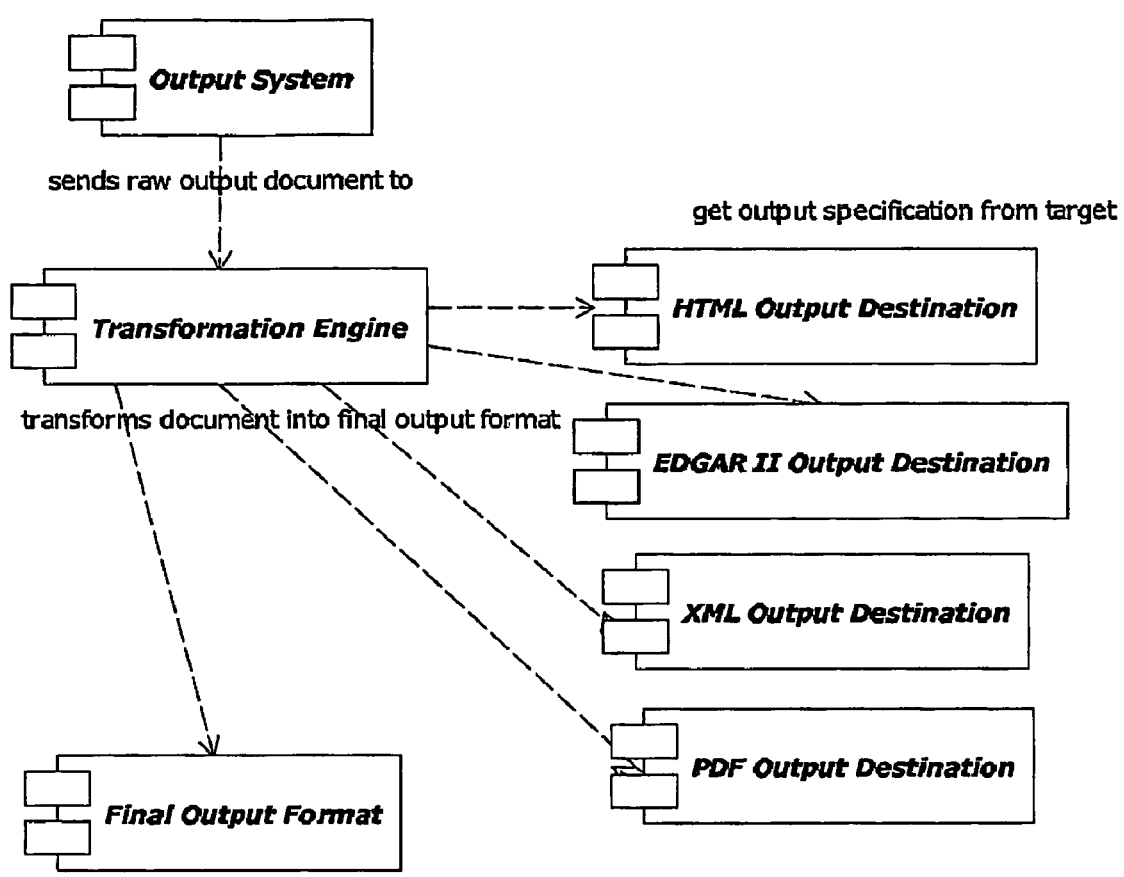
FIG. 18 depicts the gross architecture of the output system in which the transformation engine retrieves output specifications from an output format destination in accordance with an embodiment of the invention.

When the user begins a new edition of an existing publication (FIG. 13), the system may retrieve the last edition, now considered the foundation edition for building the new edition. If any component has been updated since the foundation edition was archived, the up-to-date component is incorporated by reference. The part of the system called the document manager delegates document assembly to the AutoPopulator, which reevaluates each element in the publication outline to ensure that it still conforms to the current business rules and publication environment (FIG. 13). If business objects and rules have changed, a particular element may no longer belong in the publication. Rather than omitting the formerly valid element, the system includes it with a soft include status, which represents an error state. All such soft inclusions must either (a) be deleted from the edition by the user or (b) have usage rules changed at the appropriate level to confirm its appropriateness before the edition can be published.

An example of a change in usage rules that would invalidate formerly legal elements is what arises when a financial services company splits its formerly unitary prospectuses into separate retail and institutional publications. The business objects would be updated to reflect this change; therefore, language specific to the institutional investor would no longer warrant inclusion in a retail Publication. For the retail prospectuses, the system would no longer select an a component with an "institutional" property.

In the assembly process, the system evaluates element candidacy for inclusion. A candidate element is an element that wholly or in part satisfies the requirements for inclusion at a specific location in a particular document Candidacy is evaluated from the most specific to the more general, that is, from satisfying the most rules-to-property matches to the fewest. Some component properties may be required matches, such as language, and result in no candidates being returned if no matches are found Document assembly is controlled by the document environment system based on multiple rules. These rules may include:

a) The element's context, which may be described in fully qualified terms (all its Parents, beginning from the Root Element) or in a relative way (reference upward to a specific parent Element); the element's context property must match the selected insertion point) XML-based rules can constrain the assembly of elements within an active edition by requiring specific structures.

b) Business object rules and properties, evaluated in the local Environment. Deployment-specific business data may dictate that specific content may be eligible or ineligible within the scope of an active edition or portion.

c) Rules that evaluate attribute values of either the element or both the element and its parent(s). Sectional switching of environment properties can determine eligibility or ineligibility of content. A good example would be the setting of a particular language within part of an active edition.

d) Rules that components must conform to certain qualitative properties in order to be eligible for inclusion in an active edition.

e) Dynamic substitution of one component within a content group for another, switched on certain environment variables. For example, the switching between an English and French version of the same paragraph could be accomplished with this mechanism.

When the user begins the very first edition of a new Publication (FIG. 13), the system may follow the methods described above to determine candidacy of elements and components. If, as may be the case, no matching elements are found for a location, the system will insert placeholders for required elements in the edition, following the formal structural rules of the publication type. At the least, the edition will consist of these structural placeholders. At best, the edition will consist of all of the qualified components in context that exist in the library and placeholders for required content that does not yet exist in the library.

Underneath this whole system lie structural maps of a company's documents developed by document analysis and/or formalized descriptions of an organization's style and business rules. These structural maps follow a standardized syntax for describing documents generically and may use XML Document Type Definitions (DTDs) or an XML schema.

The Structure Bar Editing Interface

The invention addresses the need for a user-friendly editor for structured documents, especially editing XML documents. A major objection of many users to prior methods of editing structured documents was either that (a) too much knowledge of the markup principles was required to use the system easily or that (b) so little of the structure was displayed that mistakes happened frequently and were only discovered when the markup was validated.

The solution adopted by the invention is (1) to present the document outline as a hybrid between a pure XML Schema abstract tree and the actual content in the document so that the user has a sense of the topic outline; and (2) to segregate the structural information contained in the document markup from the text of the document, which is presented as and can be edited in a format that approximates the typeset page (hereinafter termed "WYSIWYG").

Figure 20:
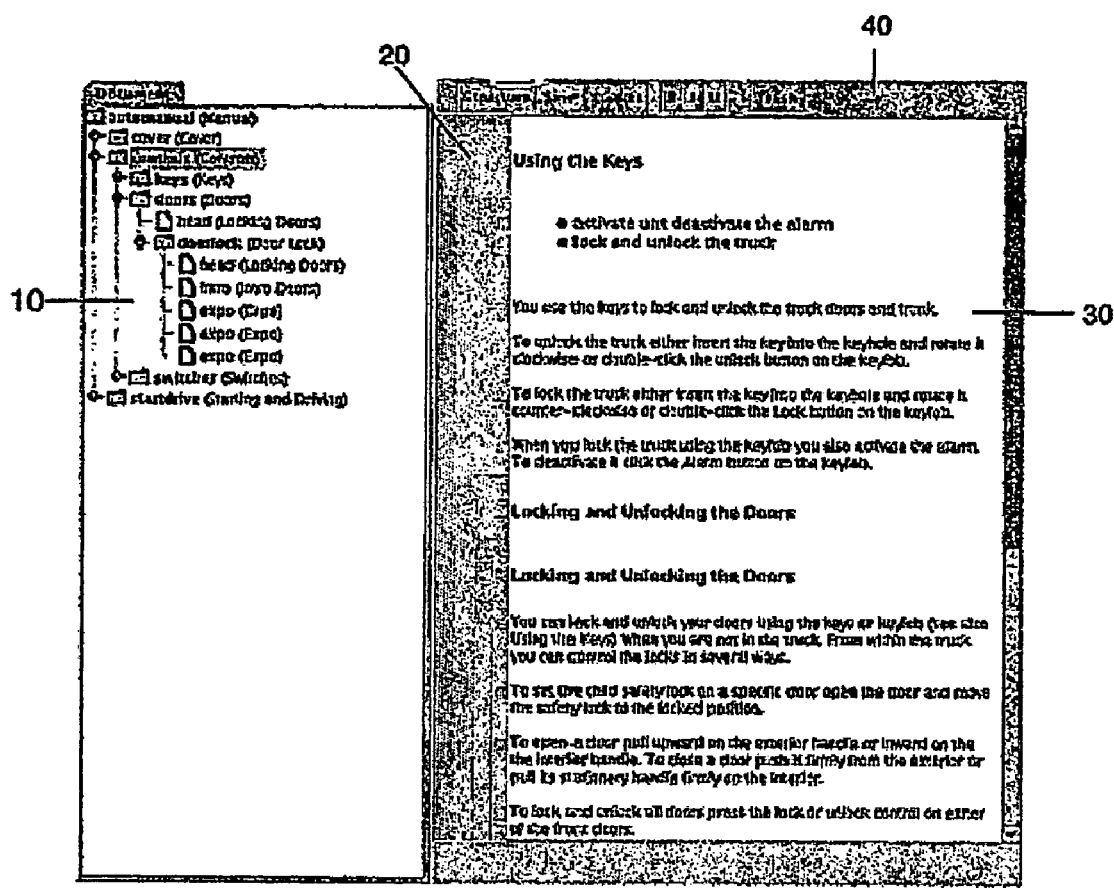
FIG. 20 depicts the user interface screen for editing Active Editions, showing the Hybrid Tree navigation window, the structure bar, and the WYSIWYG editing window, in accordance with an embodiment of the invention.

The present system's document editing system includes a user interface 1 as shown in FIG. 20 that may consist of three main components: a hybrid tree 10 which is a collapsible tree representing the document's structure and may be placed, although not limited to, along the left side of the display; an editor pane, editor pane 30 where the editable WYSIWYG document is displayed; and a structure bar 20 for graphically displaying structural information about the content in the editor pane. The user interface may also include a toolbar 40 with various control buttons and icons.

Figure 21:
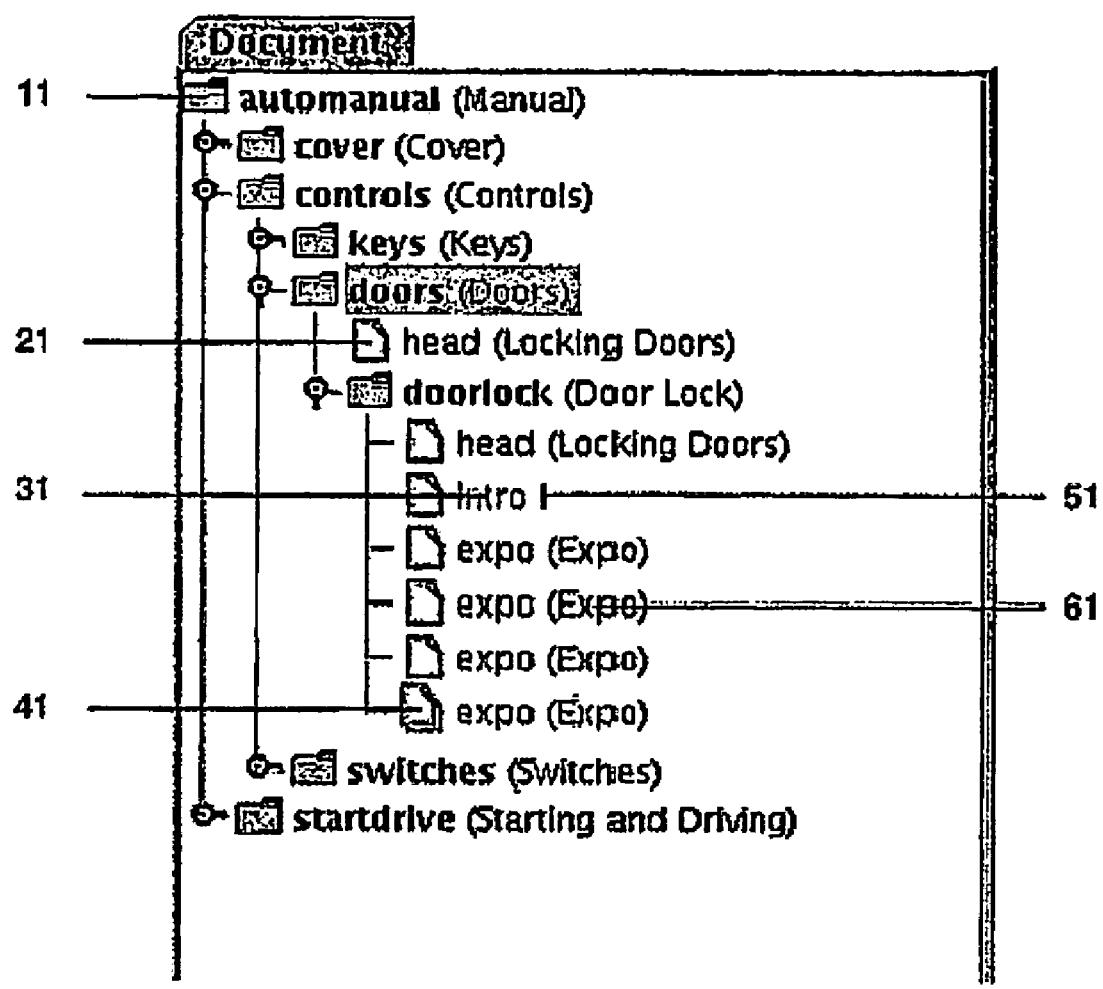
FIG. 21 is a closer view of the hybrid tree interface in accordance with an embodiment of the invention.

The hybrid tree may be used as a hierarchical navigational tool that represents a document's structure, plus any "required-and-missing" structure as defined by the document's specification. The hybrid tree as shown in FIG. 21 may consist of container nodes 11, component nodes 21, ghost nodes 31, multi nodes 41 and error indicators 51. Container nodes 11 may represent structural sections of the document. Each container node 11 may contain a number of component nodes 21 that represent the individual content pieces in the document section. The hybrid tree may be used to select a portion of the document to edit by clicking on either a container node 11, or a component node 21 at which point the editor pane is populated with a WYSIWYG rendering of the selected portion of the document. The selected node will remain highlighted indicating the currently selected document section.

Ghost nodes 31 may represent portions of the document that don't yet exist, but are defined in the document's specification. Multi nodes 41 associated with a ghost node 31 may signify that the specification allows repeated instances of a component at the location. An error indicator 51 may be displayed in conjunction with a ghost node 31 to indicate that the specification mandates the existence of a component or container at this location. A user may quickly address this error by clicking on the ghost node 31, which enables the addition of an appropriate component.

Figure 23:
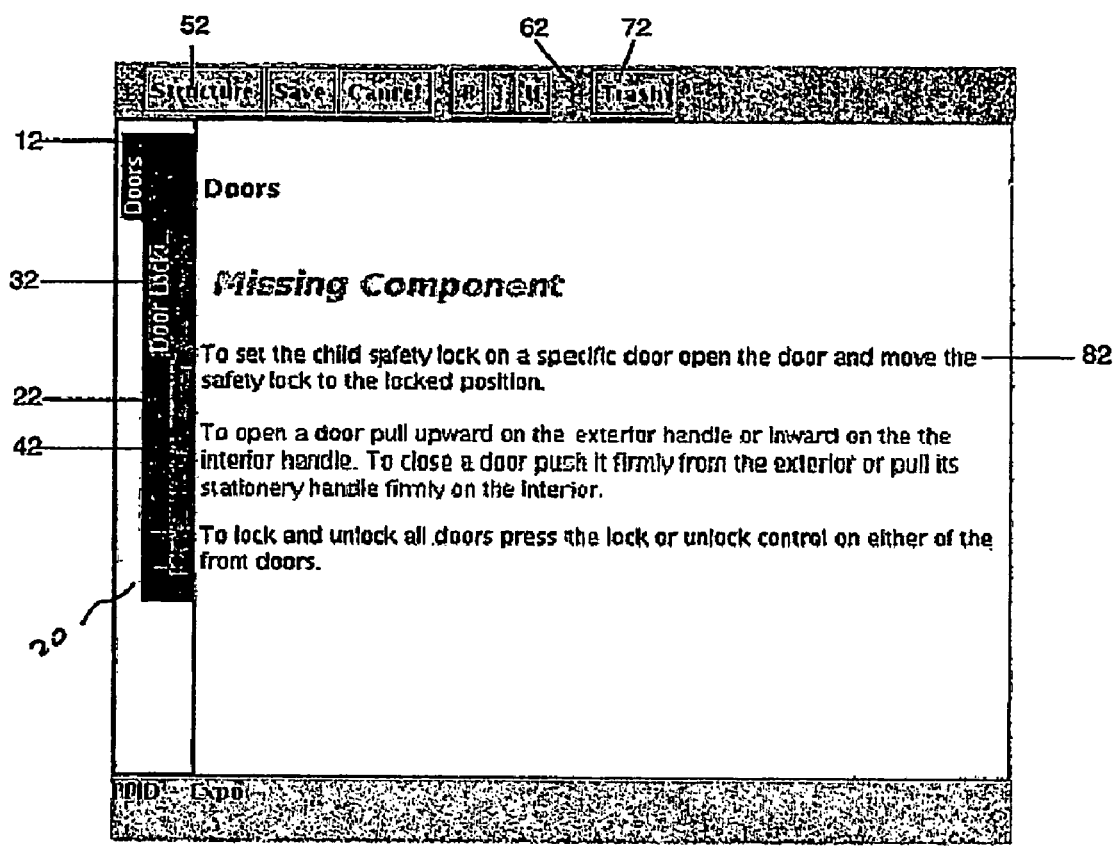
FIG. 23 is a close-up of the structure bar and editor pane interface in accordance with an embodiment of the invention.

The system may also utilize a tool known as a structure bar as shown in FIG. 23. The structure bar 20 describes the conceptual and organizational structure of a active edition 30 without affecting the WYSIWYG presentation of that active edition 30. The structure bar 20 facilitates manipulation of the active edition's structure through reordering, moving, removing, and inserting components and sections. The structure bar 20 may also facilitate the accessing/updating of a component's metadata and alert users to mission-critical deficiencies in the active edition 30 as described by a XML schema.

Although most word processors facilitate editing in a WYSIWYG environment, they do not convey information about a document's conceptual structure and its rules. Additionally, there are many XML editors that facilitate structural document editing, but they lack the benefits of WYSIWYG editing. The structure bar presents information that is based on non-visible (and therefore beyond the scope of WYSIWYG) structural elements. The structure bar 20 enables manipulation of these "bracketed groups" as a whole, unlike the code editors utilizing bracket displays.

The structure bar 20 enforces a clean and complete integration of structure and content. This allows contributing content editors to work in the familiar environment of point-and-click editing, shielded from the complexities of structured content. Structural changes are made simple with the use of drag and drop insertion, reordering, and deletion of components.

The structure bar 20 is presented in a vertical orientation, to the left of and adjacent to, the presentation of the active edition 30 being audited. Each component presented on the right, has a corresponding handle 12 on the left. The handle 12 is an iconized representation of the component 82 that may allow direct manipulation of its associated component. A handle 12 registers vertically with its corresponding component. To remove a component, its handle 12 is dragged to the trash icon 72. To move a component, its handle 12 is dragged to the new destination in the active edition 30.

Additionally, containers 22 have representative handles in the structure bar. Containers 22 represent a section of the active edition. They are represented graphically as brackets containing the handles of the components 82 that belong in the section. The container's handle may be manipulated in the same manner as those representing standard components. The effects of moving/removing this handle is reflected on all contained components.

To remove a component 82 or container 22 from the active edition, its handle is dragged to the trash icon 72. To move a component 82 or container 22 within the active edition 30, its handle is dragged to the desired destination in the editor pane. To insert a component 82 into the active edition, the insert icon 62 is dragged to the desired destination in the editor pane.

The structure bar and editor pane provide vital feedback during an insert/move component drag. While a component 82 or insert icon 62 is being dragged over the active edition 30, a line may be drawn in the active edition 30 indicating the currently selected insertion point. Insertion lines may be drawn in the space between components that are closest to the mouse pointer. As these insertion lines are drawn, the container 22 that contains the considered insertion point may be highlighted. When two adjacent components have different parent containers, the necessary number of insertion points may be available between these components, and for each, the appropriate parenting container may be highlighted.

Rolling a mouse over a handle may highlight it and cause a tool tip to appear. This tool tip may contain basic metadata such as, but not limited to, the component's XML tagname, and display name. Double-clicking the handle may cause the full component metadata panel to appear. This panel may display and allow a user to change data pertinent to the component.

As in the hybrid tree, missing component indicators 32 may be displayed to mark locations of the active edition 30 where content required by the specification is missing. Accordingly, the user knows that an action must be taken to meet the specification. Additional information regarding the nature of any error indicator is available by clicking on or rolling over it.

Figure 24:
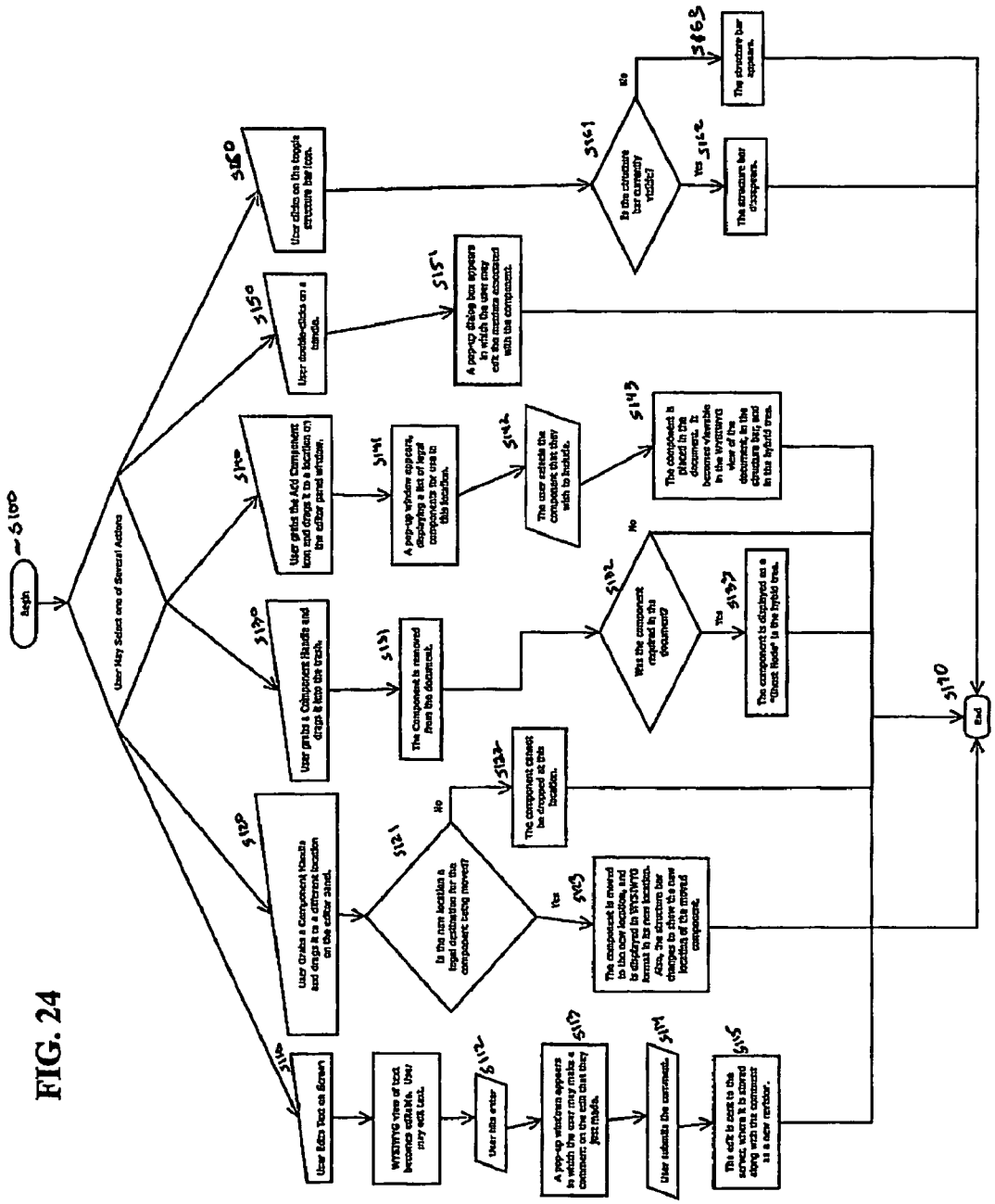
FIG. 24 is a flow diagram of various user actions that can be made in the editor panel in accordance with an embodiment of the invention.

FIG. 24 is a flow diagram depicting possible actions that user may perform while editing an active edition. The process begins in S100 when a user may select one of many actions. For instance, the user may choose to edit text on a screen in S110. After which, the WYSIWYG view of the text is editable in S111. After the text is edited, a user may hit enter in S112 causing a pop up window to open in which a user may comment on the edited text in S113. The user submits the comment in S114 and the edited text and the comments are stored on a server as new revision in S115 and the process is ended at S170.

In S120, a user may grab a handle and drag the associated component to a different location. The system then determines if the new location is an appropriate destination in S121. If the destination is appropriate, the component is moved to the new location and both the active edition and structure bar displays the component in the new location in S123. If the destination is not appropriate, then the component is not moved in S122.

In S130, a user may grab a handle and drag the handle to the trash icon. The associated component is removed from the active edition in S131 and a determination is made in S132 as to whether the component is required in the active edition. If it isn't required, the process ends at S170. If the component is required, the component node is displayed as ghost node in the hybrid tree in S133.

The user may also wish to add a component to the active edition in S140 by grabbing the add component icon and dragging the icon to a desired location within the active edition. In S141, a pop up window appears displaying all the appropriate components for the desired location for a user to select in S142. After a selection is made, the component is displayed in the active edition, the hybrid tree, and the structure bar in S143.

If a user wants to edit the metadata associated with a component, the user may double click on the handle in S150. A pop up dialog box will appear in S151 where the user may edit the metadata associated with the component.

A user may also want to toggle the structure bar on/off. If so, a user may click on the structure bar toggle button in S160. Then a determination is made in S161 as to whether or not the structure bar is visible. If the structure bar is visible, the structure bar disappears in S162. If the structure bar is not visible, the structure bar appears in S163.

Figure 25:
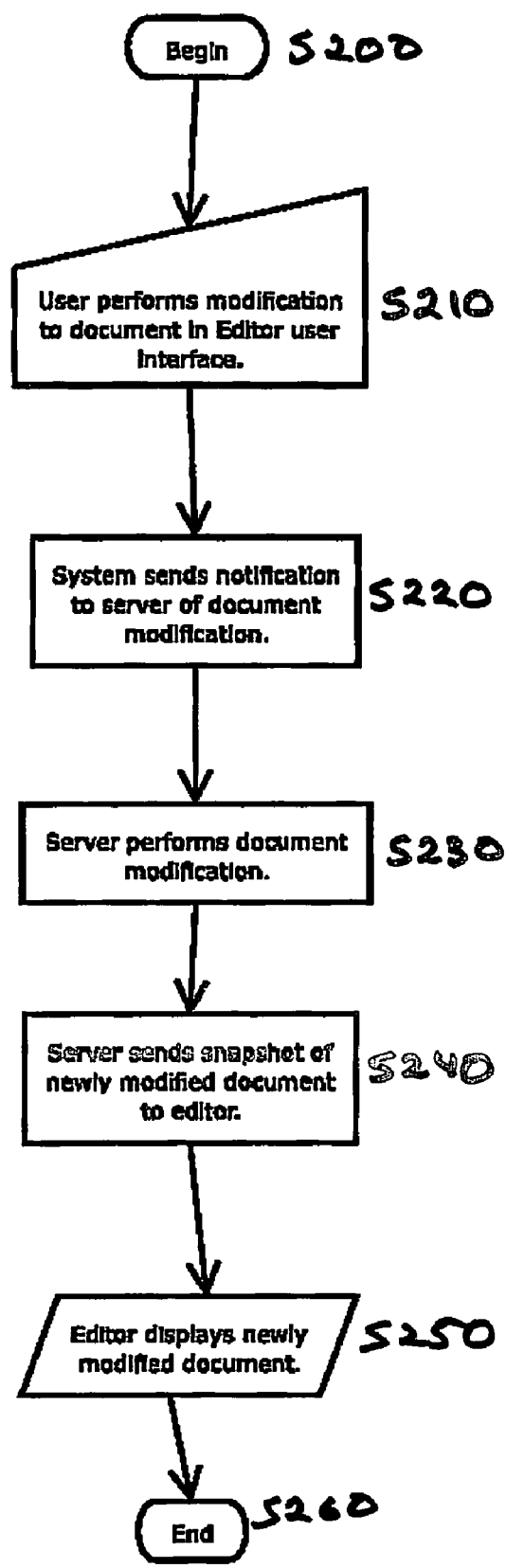
FIG. 25 is a flow diagram of an active edition modification sequence in accordance with an embodiment of the invention.
Figure 26A:
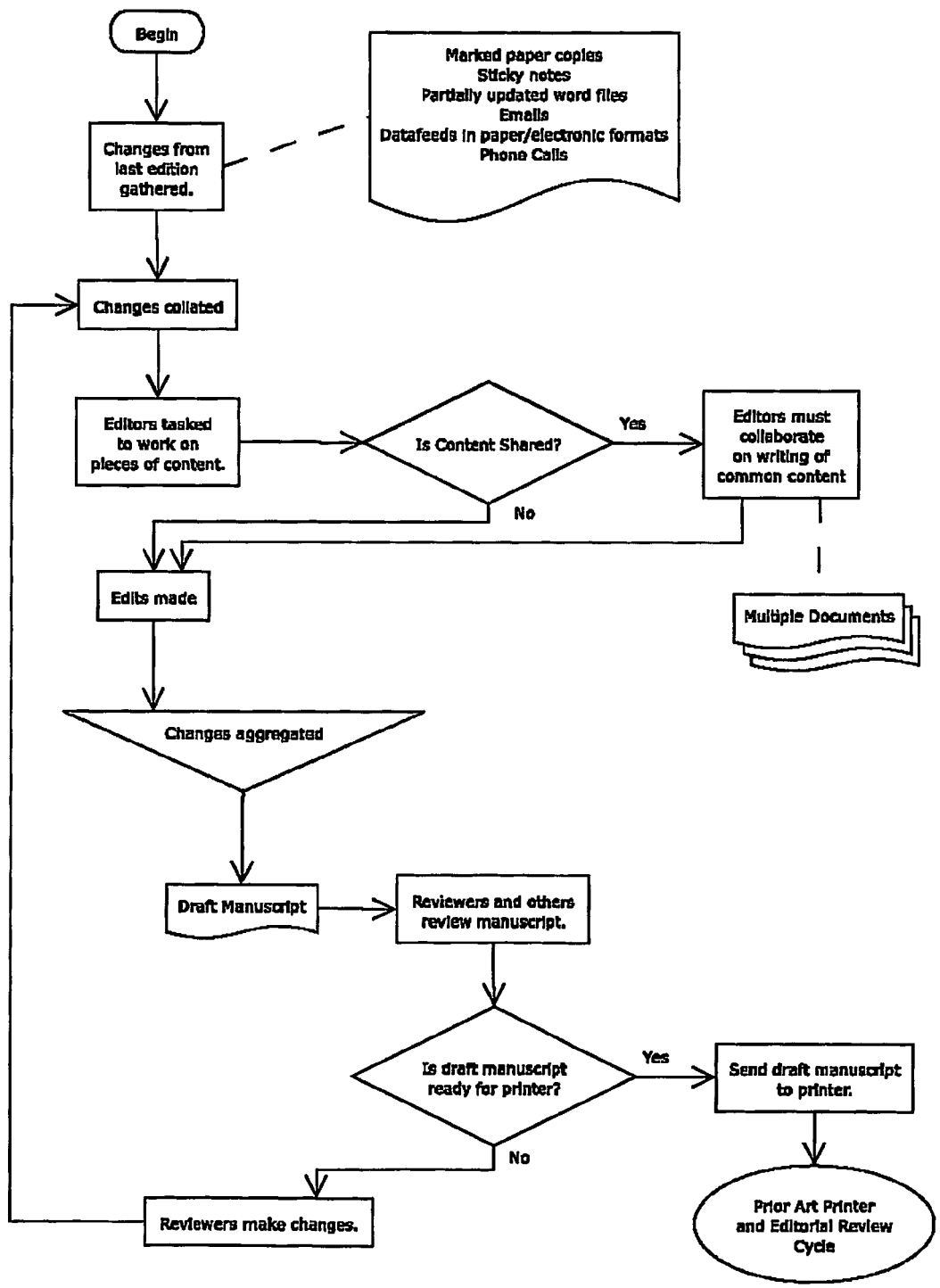
FIGS. 26a, 26b, and 26c depict a comparison between a prior art method and an embodiment of the invention
Figure 26B:
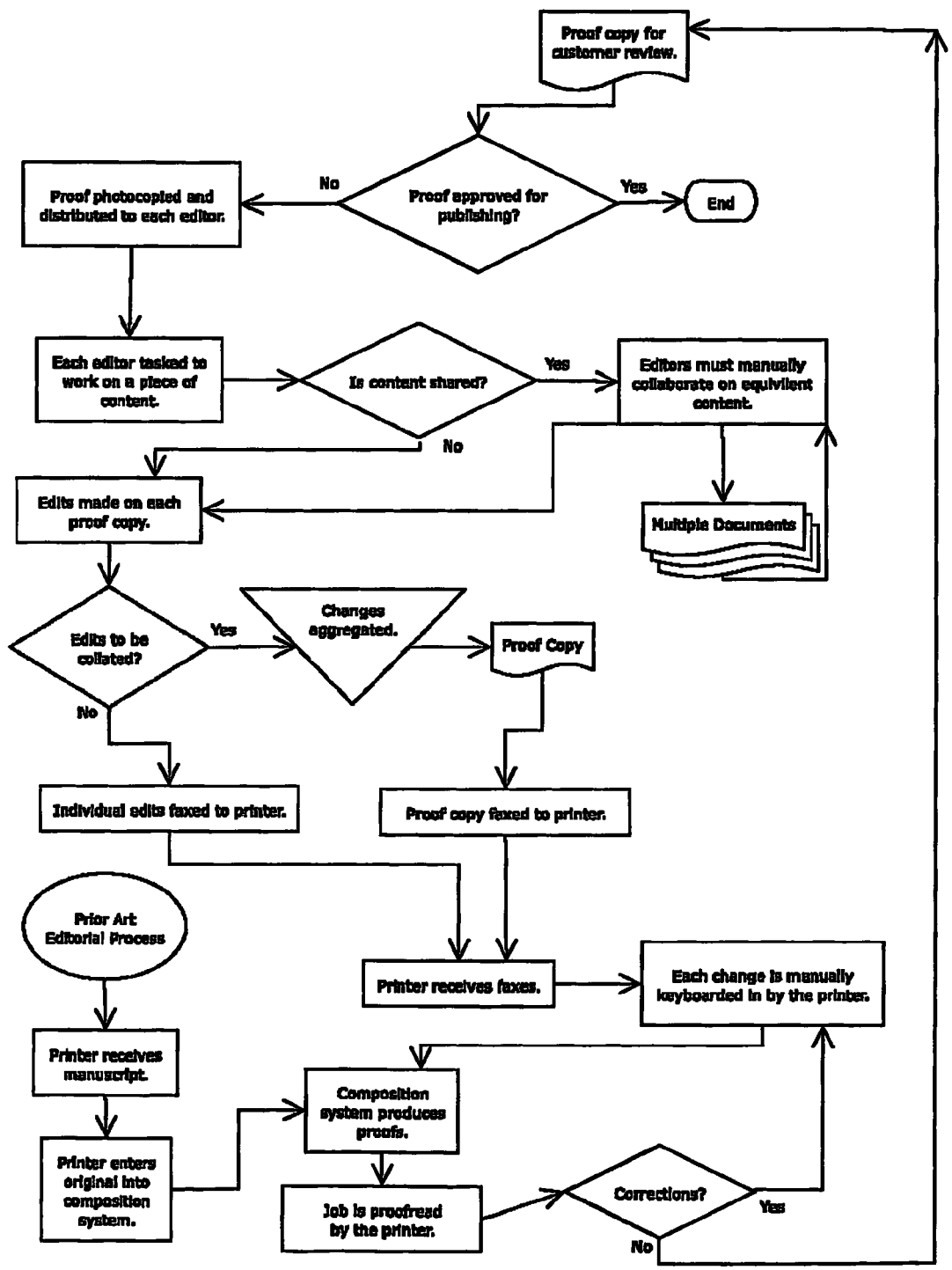
Figure 26C:
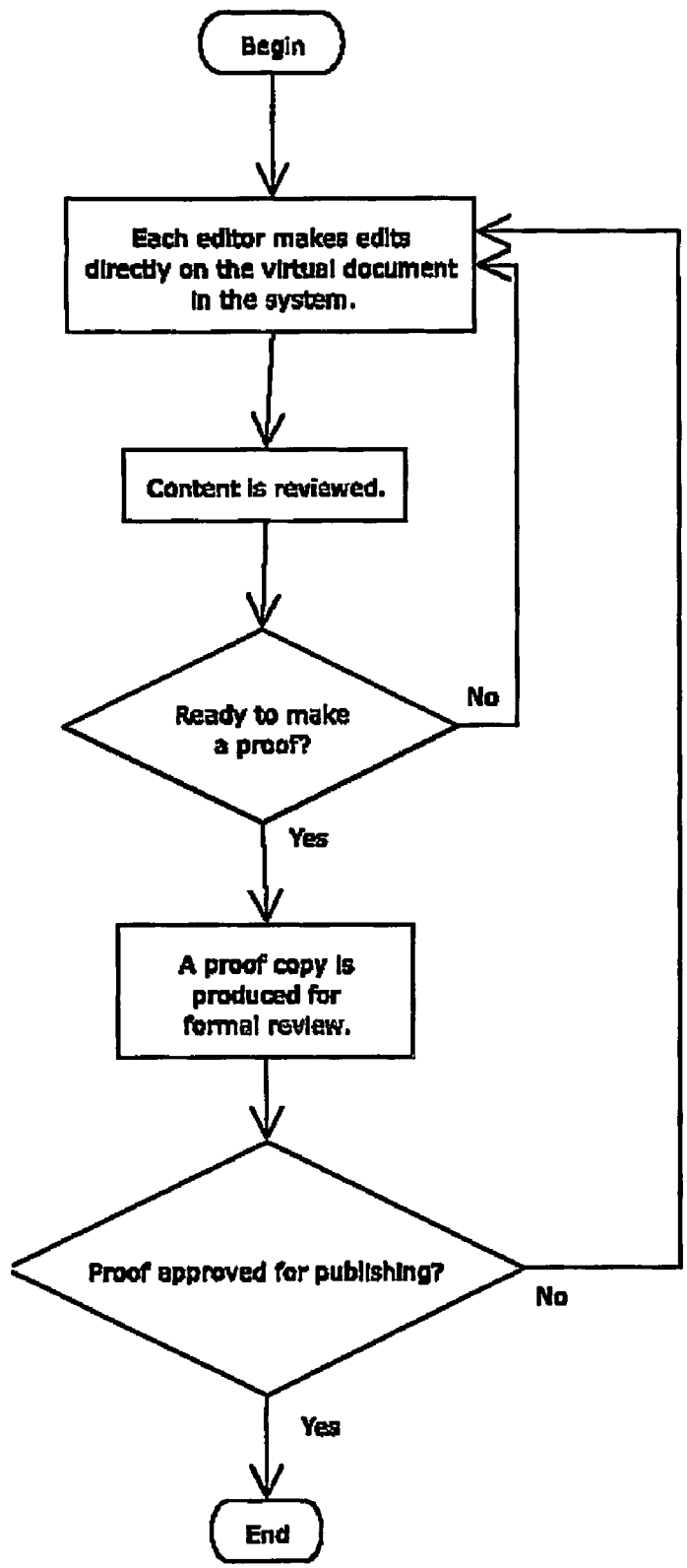

FIG. 25 depicts an active edition modification sequence. In the sequence, a user modifies an active edition in S210 using the editor user interface. In S220, the system notifies the server of the above modification. In S230, the server performs the modification and sends a snapshot of the modified active edition in S240. In S250, the editor displays the modified active edition.

Figure 22:
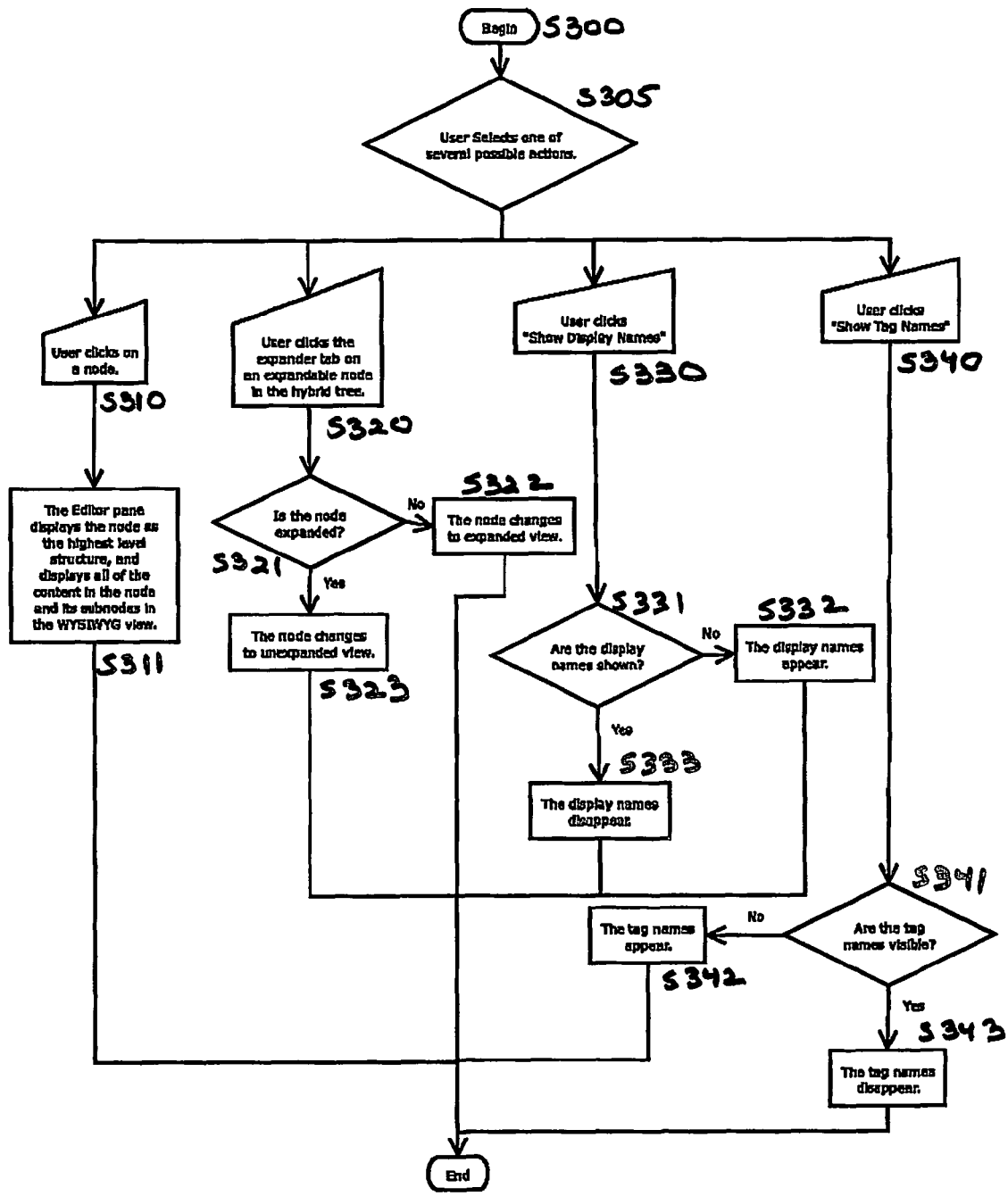
FIG. 22 is a hybrid tree user action diagram showing four flow scenarios in accordance with an embodiment of the invention.

FIG. 22 represents the possible actions a user may perform in the hybrid tree. In S305, a user selects an action to perform. If a user clicks on a node in S310, the editor pane displays the node as the highest level and displays all of the content in the node and its corresponding sub nodes in the active edition in S311. If a user clicks on the expander tab of an expandable node in S320, a determination is made as to whether the node is expanded in S321. If the node is not expanded, the node changes to an expanded view in S322. If the node is expanded, the node changes to an unexpanded view in S323. If a user clicks on show display names in S330, the system determines if the display names are shown in S331. If the display names are not shown, then they appear in S332. If the display names are shown, then they disappear in S333. If a user clicks on show tag names in S340, the system determines if the tag names are shown in S341. If the tag names are not shown, then they appear in S342. If the tag names are shown, then they disappear in S343.

The Proof State, Review Cycle, and Issue Tracking System

After users have made a series of revisions, they may wish to review the edition formatted as it will be distributed. To do so, they can generate a proof. In the present invention, a proof is a static representation of the Active Edition at a point in time, such as typeset pages in a portable format like PDF, an HTML file, etc. The user with proofing privileges can generate a proof at any time when an edition is active; they are available in minutes for viewing or client use, i.e, on a Web or file transfer protocol (FTP) site or any other network protocol site. Proofs can be prepared and circulated over such networks in PDF or in other formats. A number of formats can also be generated automatically with every proof. Blacklined proofs can be requested at any time, against any prior proof, as part of generating a proof. The generated proofs, components, and published proofs are archived for future access.

The system of the present invention introduces the concept of a review cycle, during which reviewers can view a proof. Reviewers, both in-house and outside the company, can provide comments electronically; their comments can be attached to any point in a proof and are tracked as issues. Company users can respond using email or the same built-in commenting facility. During the review period, while reviewers are looking at a frozen proof, users can continue to work on the active edition. Rather than waiting to begin changes in response to reviewers' comments, such comments can be worked on actively and interactively.

All comments are entered into the issue tracking system. Issues track comments and questions regarding content, component currency and applicability, versions, policies, etc. Issues may need to be resolved in order to publish an edition, to initiate translation or localization of components, or to set broader policies that may affect multiple publications. Users may assign a priority level to an issue; each level determines the behavior of the system, depending on deployment configuration. Issues may be assigned to particular team members and are tracked as to their status. Possible issue states are: open, amended, resolved, and deferred. Issues may be posted by users or be invoked automatically by the system in defined situations, such as when a component has passed its expiration date with no new component available. Some issues, such as missing translations of components, may be resolved by the system with appropriate actions on the part of users or another system facility.

Translation Management

The system may manage documents that are published in several languages or in multi-lingual editions. The system's design also recognizes that documents may require further individuation depending on a geographic environment, since market and regulatory requirements differ between national, state, and provincial entities.

Translation and localization are independent properties because languages are often spoken in more than one sovereign entity. For instance, documents in Switzerland, which has its own set of national regulatory requirements, often appear in German, French, Italian, and English languages; to conform to Swiss law rather than French law, the French text in Switzerland may require different wording than in France, and so on for each pairing of language and localization properties. The system may manage this situation by its ability to store versions in content groups, where components can subscribe to other members and where components can have strong and weak dependencies on other members.

In the most frequent case, a publication is created originally in a single language. Since this is likely in the language of the author(s), the original version often becomes the authoritative or "Primary" version, and revisions to its components drive revisions to versions in other languages. Such a situation calls for a strong dependency of the translated versions on the primary one; the other versions may "subscribe" to the original.

Weak dependencies arise as the net expands further, especially when versions diverge in both language and localization or other property. A publication at the far end of the net may not depend on the first version but be related to a second publication that was derived from the authoritative one; such a weak dependency on the original may not directly drive revisions to the publication at the end of the net. This publication may wish to receive notice of revision to the original authoritative version but not be compelled to act on the notice.

The system may be configured to monitor the existence or non-existence of component versions in languages secondary to the primary one. Given the existence or creation of a publication in one of the secondary languages, the system may automatically assemble the components that do not have versions in that language for distribution to the translators or translation service. Exact mechanisms for exchange are configured at deployment, but include:

1. Structured file transfer to/from translators
    2. Dedicated browser interface for real-time translation
    3. Direct database connectivity for batch or real-time translation Each component lacking a needed translation has an issue posted against it. When the translation is returned and uploaded, the system changes the issue's status to resolved. The issue display screen can be configured at deployment for the client's work processes, either displaying each such translation issue or subsetting by issue type.

Versioning enables document publishing strategies besides language translation and localization. It supports filings in the same country for a master document with variations for local governments. For instance, in the United States insurance plans have state-specific compliance content. Product manuals could contain expanded sales information for consumers and proprietary technical information for service organizations. Catalogs could be focused for specific markets.

Permissions

The system allows an administrator to assign access/editing permissions and workgroup membership to users. It also allows differential access to system facilities within the company or outside the company. The ProofPlus Client Interface (Command Layer) enforces the permissions as requests from users are received. The permissions system controls an individual's view of the system by controlling the user's screen display and the portlets to other system actions displayed when the user logs in. For instance, a user tasked to manage documents will have a comprehensive display of all system objects: publication archives, active editions, issue tracking, teams, and a fully articulated view of active editions' review status. A contributing editor will see a more restricted view, allowing access to only those active editions to which he/she is a contributor and to related system facilities.

The system may include a request processor that manages a number of discrete user permissions such as, but not limited to:
- Create documents
- Author components
- Edit component properties
- Edit element usage rules
- Review proofs
- Comment on proofs
- Update (edit) documents
- Generate proofs
- Approve and remove approval of documents
- Publish documents
- Update Business Object tables
- Access, create, and edit tables (content)
- Delete components from library
- Access, create, and edit footnotes
- Receive automatic notifications of document having been published
- Receive automatic notifications of new document having been created
- Receive automatic notifications whenever tables are uploaded to document
- System administration on client side
- System administration on server side
- Print production specifications
- Communication memos In an embodiment of the invention, the user interface operates over the Internet to connect users to a system server. The Command Layer vets user permissions and monitors choices made by the user and returns appropriate responses, both open to the user and hidden (such as archiving). As an example, the libraries, archive, and programs used in the system are stored on an Internet server. In an embodiment of the system users interact with the system by logging onto a web site using their browsers as access portals. Reviewers can be brought into a collaborative work process over the Internet. Because the interface and retrieval tools are Internet based, the system is always available and work can be done across time zones and from any device enabled to access the Internet.

Print Preparation

In an embodiment of the system that results in printed publications, the system automates many steps that take the approved proof to print-ready files. The approved proof has its color model changed to CMYK, crop marks and other printing marks inserted, and all imposition configurations that render the files suitable for color separations and plate-making completed. In addition the system may produce secured and compressed PDFs in web-ready red green blue (RGB) color, send notifications to users and managers, and communicate traffic and printing notifications. The documents are then moved to the published archive. Other output destinations can be added to the process to support different views of the final proofs.

Although they are made up of atomized, reusable components, all publications have to be managed as if they were conventional documents. Once an edition has been published, it is stored in the document archive as a serial structured file and as a virtual document, a map of its elements. The last instance of other destination formats, such as HTML or EDGAR II, are also in the archive. While an edition is active, the archive maintains all proofs of the document to facilitate blacklining and to act as a recovery module. The archive is not a part of the component library but a separate part of the system.

The User's Conceptual View of the System in Operation

Figure 27:
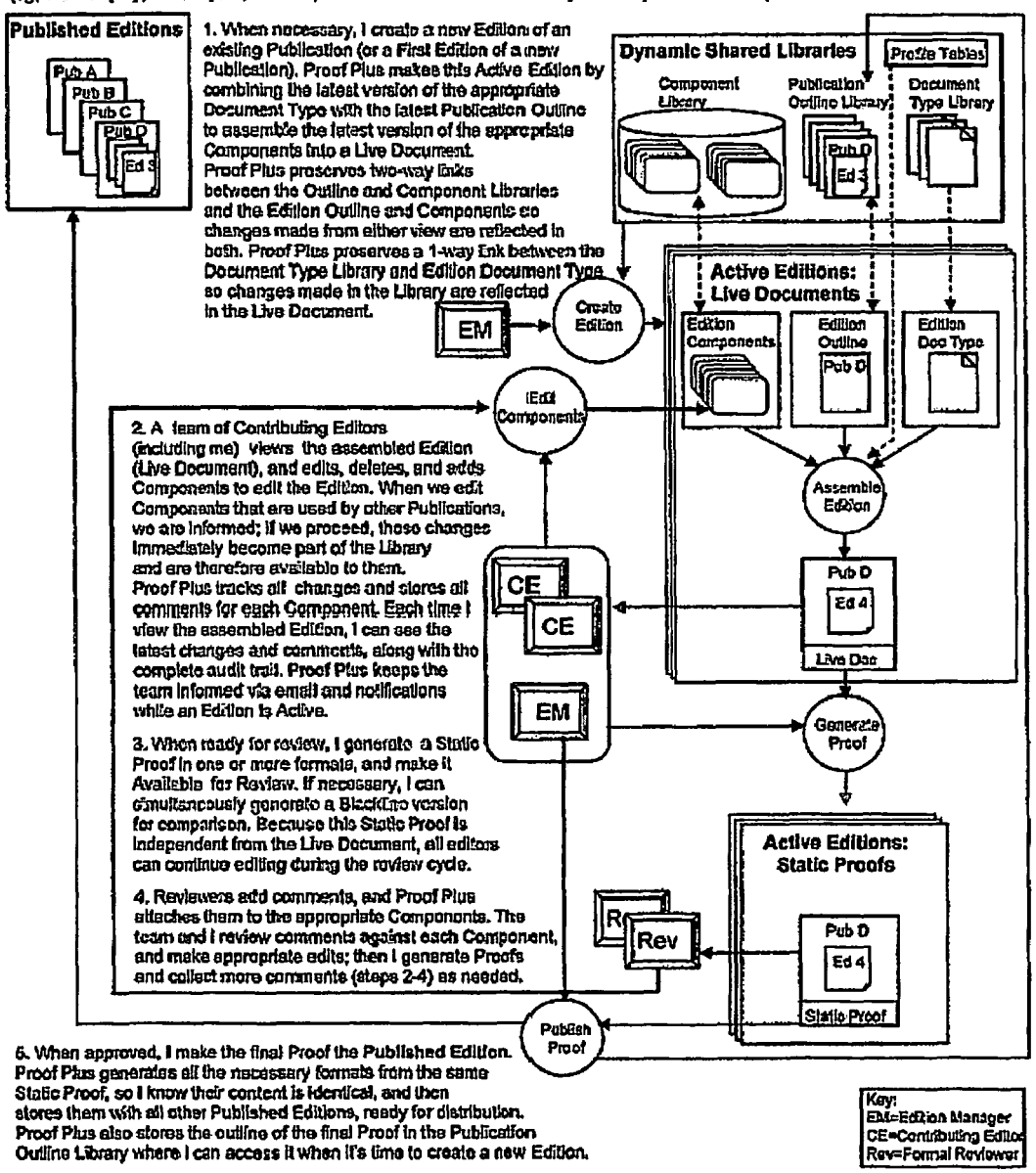
FIGS. 27, 28, and 29 depict the system's operation from the viewpoint of an edition manager, a contributing author/editor, and a reviewer in accordance with an embodiment of the invention.
Figure 28:
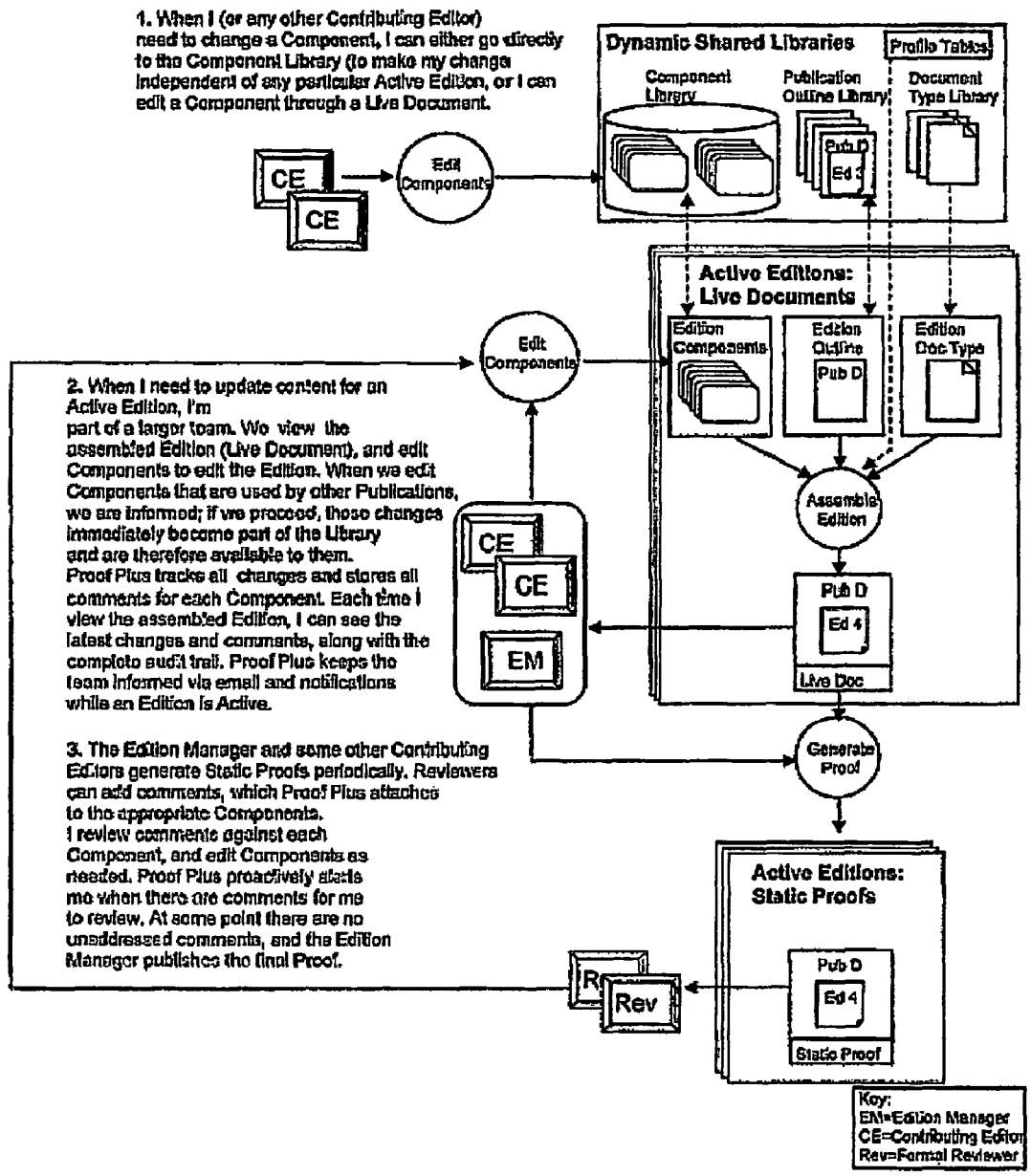
Figure 29:
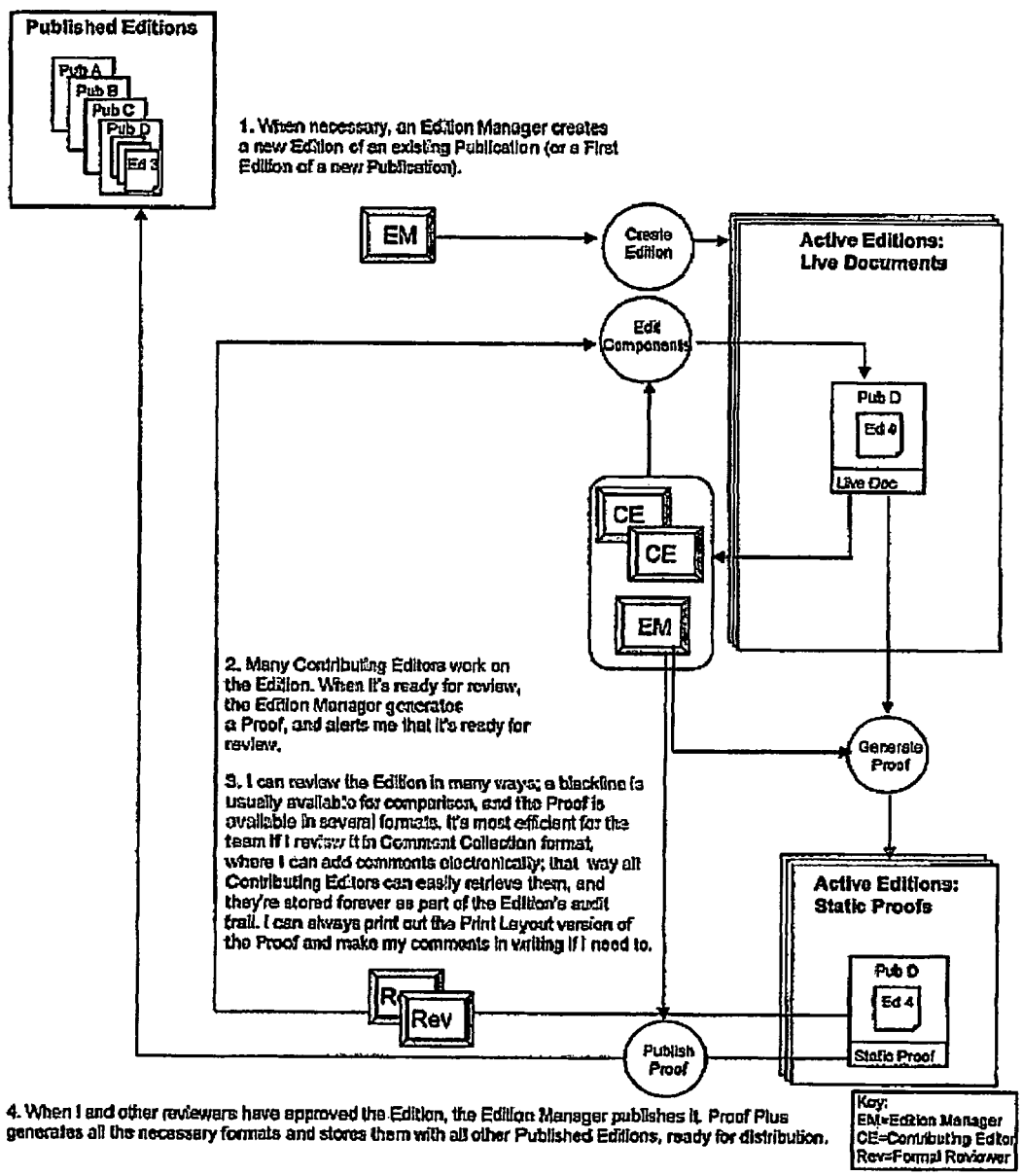

A description of the publishing process from several users' viewpoints is shown in FIGS. 27, 28 and 29 and can be summarized as follows:

First, a user, functioning as the edition's manager, creates an edition of a publication. An edition is a periodic iteration of a publication, whether the iteration is instigated by a predetermined schedule or by market/regulatory requirements. Editions may incorporate new content and/or revisions of the previous edition. When a new edition is being prepared, it is said to be an active edition. The active edition may be edited, which includes the addition of new components as warranted or desired. The user may now edit the assembled active edition, navigating through the hybrid tree display and making changes in the editing panel as described above.

The user managing the edition may request proofs of an active edition at any time. The user may request a blacklined proof in addition to a clean version. The blacklining is dynamic in the sense that the new proof may be compared to any other proof or to the document's opening state according to the user's request. Every time the user generates a proof, they have the option to receive a blacklined proof and choose the proof for comparison. Thus, varying levels of cumulative changes can be documented Subsequently the user managing the edition distributes the proofs for review and comment. The manager may choose from multiple distribution lists plus add individual recipients. Reviewers, editors, and managers can access the proof over the Internet or other network connection. Changes and comments to document components are flagged from proof to proof. While reviewing a proof, a user may have an issue with the proof that needs to be examined; by making an electronic comment, the user enters the comment into the issue tracking system.

The user may also consult an audit trail which tracks all changes to component content as to who, when, in what context, and why revisions were made. The changes are shown as blacklined displays with full statistical information for each and every revision. The audit trail may also be useful for financial institutions that have to keep detailed records due to regulatory requirements established by the United States government such as the Sarbanes Oxley Act of 2002.

Figure 19:
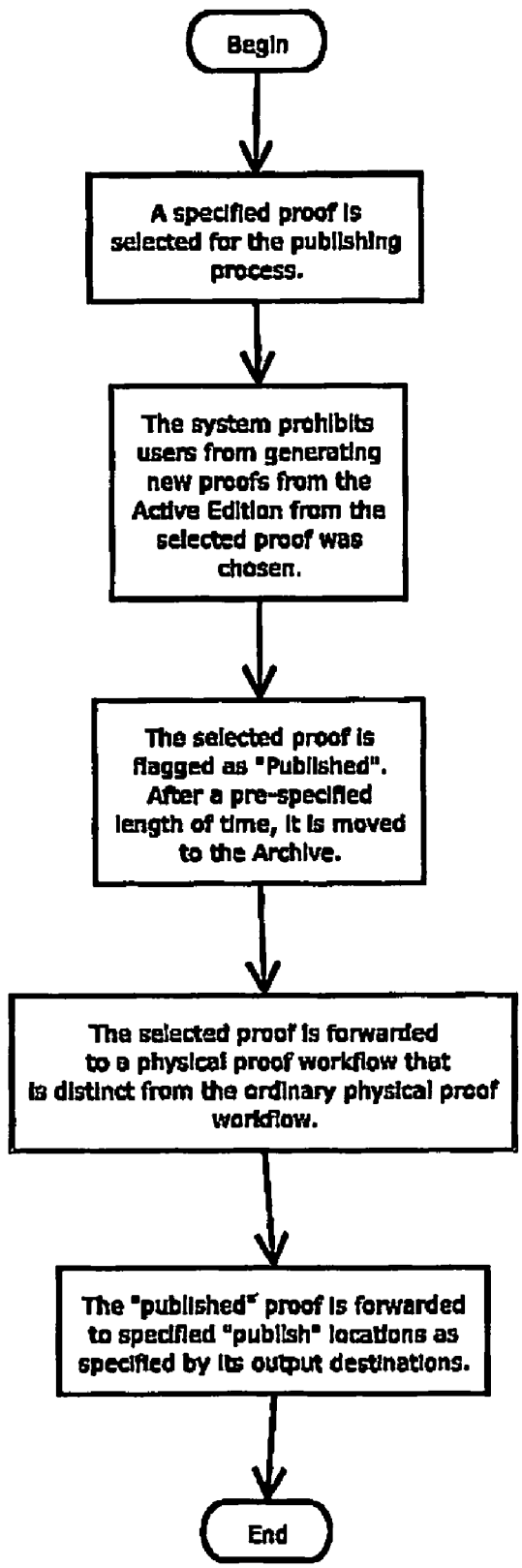
FIG. 19 is a flow diagram of the actions upon a document's change of state to "Publish" in accordance with an embodiment of the invention.

Users with appropriate permissions may edit, reproof, and review the proofs as needed. A privileged user can approve a proof as a final version of the edition and thereafter, "publish" the approved proof. When an approved proof is published, as shown in FIG. 19, it is granted approval for distribution to its intended set of recipients in the particular formats established at deployment time. A published document represents the final state of the current edition that is archived. Although particular deployments may create imposed print masters, may deliver special electronic formats to certain recipients, and may post publications to a Web or other network site, these actions are subsequent to the publish action in the system and do not affect the underlying storage structure of the published document.

After a proof is approved for publishing, a reviewer or editor may decide that a component or multiple components may need to be edited. In such instances, the approval to publish may be revoked. Upon revocation, the contributors and edition manager may choose to assemble and edit as usual or may request a mode of operation called restricted editing. In restricted editing, the user sees a list of shared components within the active edition that have been revised since the current edition was approved for publishing. The user can choose to apply these revisions to the active edition in restricted mode or not. Any of the edits that instigated the revocation of the approved status may be applied to the current document only (and expire with the edition), applied to all qualifying documents immediately, or applied to all future qualifying active editions.

Although preferred embodiments of the present invention and modifications thereof have been described in detail herein, it is to be understood that this invention is not limited to those precise embodiments and modifications, and that other modifications and variations may be effected by one skilled in the art without departing from the spirit and scope of the invention as defined by the appended claims.

We claim:

1. An automated document publishing system implemented by at least one computer, said system comprising:
   a document type store stored on said at least one computer and containing a plurality of document types, each document type identifying a document structure definition for use in the construction of a virtual document edition, each document structure definition comprising a hierarchy of element definitions;
   a business data store stored on said at least one computer and containing business data;
   a content library store stored on said at least one computer and containing a library of content components, each component being capable of use in a plurality of documents by reference;
   an element store stored on said at least one computer and containing a plurality of elements for use in the construction of a virtual document edition, each said element being defined by a said element definition and identifying a said component by reference;
   a document manager configured for execution by said at least one computer for using a selected said document type, said business data, and said elements to form a document structure for a virtual document edition to identify a plurality of said elements, each said element identifying a said component by reference and/or at least one other said element;
   a document structure store stored on said at least one computer and storing at least one said document structure for at least one respective document edition to be published; and
   an output module configured for execution by said at least one computer for forming a structured serial document for publishing using said document structure.

2. An automated document publishing system according to claim 1, wherein said element definitions define element attributes, said elements include rules related to said business data and attributes and said document manager is adapted to form said document structure using said attributes and rules.

3. An automated document publishing system according to claim 1, wherein said document manager is adapted to auto-populate said document structure based on said selected document type.

4. An automated document publishing system according to claim 3, wherein said document manager is adapted to auto-populate said document structure by selecting and evaluating candidate elements against said business data.

5. An automated document publishing system according to claim 3, wherein said document manager is adapted to auto-populate said document structure using a said document structure of a previous edition and re-evaluating the elements and identified components against said business data.

6. An automated document publishing system according to claim 5, wherein said document manager is adapted to auto-populate said document structure using rules based on contexts and attributes for said elements and properties of identified components, said business data and dynamic substitution of components.

7. An automated document publishing system according to claim 3, wherein said document manager is adapted to auto-populate said document structure using rules based on contexts and attributes for said elements and properties of identified components and said business data.

8. An automated document publishing system according to claim 1, wherein each said document structure definition has a root element defining only other elements.

9. An automated document publishing system according to claim 1, wherein said document edition includes mandated content required to be present in the document edition, said document manager is adapted to use said document type, said business data, and said elements to identify mandated elements that are required to be present in the document structure to identify required components, to include said required elements in the document structure and to identify in the document structure any said required elements missing in said element store, said any missing elements identifying any missing components in said content library.

10. An automated document publishing system according to claim 9, wherein said output system is adapted to only publish document editions having all required elements and identified components.

11. An automated document publishing system according to claim 1, further comprising an archive store for storing said structured serial document and the associated document structure for published documents.

12. An automated document publishing system according to claim 1, wherein said components in said content library are stored as groups of components having defined relationship properties, wherein said document manager is adapted to select a said component of a said group in said document structure using said document type, said business data and said elements.

13. An automated document publishing system according to claim 12, wherein said components of a group comprise text in different languages, said publication type defines a publication language and said document manager is adapted to form a document structure identifying language components based on the language defined in said selected document edition.

14. An automated document publishing system according to claim 13, further comprising a translation system for identifying that a component in a group requires translation and notifying a translator that said component requires translation to create a new component in the group.

15. An automated document publishing system according to claim 1, further comprising a component interface to allow users to edit and/or add to said components in said content library.

16. An automated document publishing system according to claim 1, further comprising a proof generator for generating a proof comprising a static representation of the document edition for proofing.

17. An automated document publishing system according to claim 16, further comprising a proof archive for storing the static representation of a proof and the associated document structure.

18. An automated document publishing system according to claim 17, wherein said proof generator is adapted to generate a proof by comparison to a previously generated proof.

19. An automated document publishing system according to claim 1, further comprising a user interface for editing a document structure for a virtual document edition, the user interface further comprising first interface means for generating an image of at least one component in a first display region and enabling a user to edit said at least one component; and second interface means for generating an interface in a second display region to allow a user to make structural changes to the document structure, said second interface means being adapted to display handles in said second display region, each handle comprising an iconized representation of an element to allow selection and manipulation of the component identified by the element and being displayed in said second display region at a position adjacent to the component displayed in said first display region, and said handles being displayed as an organizational structure defining the structure of the elements of the document edition.

20. An automated document publishing system according to claim 19, further comprising third interface means for generating an image in a third display region of a hybrid tree structure representing in one display the structure of the document type of the displayed document edition and a plurality of said elements comprising said virtual document edition, wherein each element identifies a said component and/or at least one other element, and said third interface means is adapted to enable a user to select components to be displayed in said first display region.

21. An automated document publishing system according to claim 20, wherein said third interface means is adapted to highlight at least one position in the tree structure representing a position in the tree structure of at least one element identifying said at least one component displayed in said first display region.

22. An automated document publishing system according to claim 20, wherein said third interface means is adapted to indicate a position in the tree structure of an element identifying a missing component required in the document edition.

23. An automated document publishing system according to claim 19, wherein said second interface means is adapted to highlight at least one position in the structure representing a position in the structure of at least one element identifying said at least one component displayed in said first display region.

24. An automated document publishing system according to claim 19, wherein said second interface means is adapted to indicate a position in the structure of an element identifying a missing component required in the document edition.

25. An automated document publishing method comprising:
storing a plurality of document types in a document type store, each document type identifying a document structure definition for use in the construction of a virtual document edition, each document structure definition comprising a hierarchy of element definitions;
storing business data in a business data store;
storing a library of content components in a content library store, each component being capable of use in a plurality of documents by reference;
storing a plurality of elements for use in the construction of a structure of a virtual document edition in an element store, each said element being defined by a said element definition and identifying a said component by reference;
using a selected said document type, said business data, and said elements to form a document structure for a virtual document edition to identify a plurality of said elements, each said element identifying a said component by reference and/or at least one other said element;
storing at least one said document structure for at least one respective virtual document edition to be published; and
forming a structured serial document for publishing using said document structure.

26. An automated document publishing method according to claim 25, wherein said element definitions define rules and attributes, said elements include rules related to said business data and attributes and said document structure is formed using said attributes and rules.

27. An automated document publishing method according to claim 25, further comprising autopopulating said document structure for the document edition based on said selected document type.

28. An automated document publishing method according to claim 27, wherein said autopopulating of said document structure is performed by selecting and evaluating candidate elements against said business data.

29. An automated document publishing method according to claim 27, wherein said autopopulating of said document structure is performed using a said document structure of a previous edition and re-evaluating the elements and identified components against said business data.

30. An automated document publishing method according to claim 29, wherein said autopopulating of said document structure is performed using rules based on contexts and attributes for said elements and properties of identified components, said business data, and dynamic substitution of components.

31. An automated document publishing method according to claim 27, wherein said autopopulating of said document structure is performed using rules based on contexts and attributes for said elements and properties of identified components and said business data.

32. An automated document publishing method according to claim 25, wherein each said document structure definition has a root element defining only other elements.

33. An automated document publishing method according to claim 25, wherein said document edition includes mandated content required to be present in the document edition, said business data is used to identify mandated elements that are required to be present in the document structure to identify required components, said required elements are included in the document structure, and any said required elements missing in said element store are identified in the document structure, said any missing elements identifying any missing components in said content library.

34. An automated document publishing method according to claim 33, wherein only document editions having all required elements and identified components in the associated document structure are published.

35. An automated document publishing method according to claim 25, further comprising storing said structured serial document and the associated document structure for published documents.

36. An automated document publishing method according to claim 25, wherein said components are stored as groups of components having defined relationship properties, wherein a said component of a said group in said document structure is selected using said document type, said business data and said elements.

37. An automated document publishing method according to claim 36, wherein said components of a group comprise text in different languages, said publication type defines a publication language and a document structure is formed identifying language components based on the language defined in said selected document type.

38. An automated document publishing method according to claim 37, further comprising identifying that a component in a group requires translation and notifying a translator that said component requires translation to create a new component in the group.

39. An automated document publishing method according to claim 25, further comprising providing a component interface to allow users to edit and/or add to said components in said content library.

40. An automated document publishing method according to claim 25, further comprising generating a proof comprising a static representation of the document edition for proofing.

41. An automated document publishing method according to claim 40, including storing the static representation of a proof and the associated document structure.

42. An automated document publishing method according to claim 41, wherein a proof is generated by comparison to a previously generated proof.

43. An automated document publishing method according to claim 25, further comprising generating an image of at least one component in a first display region and enabling a user to edit said at least one component; generating an interface in a second display region to allow a user to make structural changes to the document structure, displaying handles in said second display region, each handle comprising an iconized representation of an element to allow selection and manipulation of the component identified by the element and being displayed in said second display region at a position adjacent to the component displayed in said first display region; and displaying said handles as an organizational structure defining the structure of the elements of the document edition.

44. An automated document publishing method according to claim 43, further comprising for generating an image in a third display region of a hybrid tree structure representing in one display the structure of the document type of the displayed document edition and a plurality of said elements comprising said document edition, wherein each element identifies a said component and/or at least one other element, to enable a user to select components to be displayed in said first display region.

45. An automated document publishing method according to claim 44, further comprising highlighting a position in the tree structure representing at least one position in the tree structure of at least one element identifying said at least one component displayed in said first display region.

46. An automated document publishing method according to claim 44, further comprising indicating a position in the tree structure of an element identifying a missing component required in the document edition.

47. An automated document publishing method according to claim 43, further comprising highlighting a position in the structure representing at least one position in the structure of at least one element identifying said at least one component displayed in said first display region.

48. An automated document publishing method according to claim 43, further comprising indicating a position in the structure of an element identifying a missing component required in the document edition.

49. A computer program product comprising a computer usable medium having computer readable code embodied therein to carry out the method of claim 25.

\* \* \* \* \*